United States Patent
Ramachandran et al.

(10) Patent No.: US 10,823,667 B1
(45) Date of Patent: Nov. 3, 2020

(54) ENGINEERED OPTICAL FIBERS AND USES THEREOF

(71) Applicant: TRUSTEES OF BOSTON UNIVERSITY, Boston, MA (US)

(72) Inventors: Siddharth Ramachandran, Boston, MA (US); Gautam Prabhakar, Boston, MA (US); Aaron G. Peterson-Greenberg, Cambridge, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 16/866,391

(22) Filed: May 4, 2020

Related U.S. Application Data

(60) Provisional application No. 62/842,895, filed on May 3, 2019.

(51) Int. Cl.
*G01N 21/31* (2006.01)
*G01N 21/21* (2006.01)
*G01N 21/01* (2006.01)

(52) U.S. Cl.
CPC ............. *G01N 21/31* (2013.01); *G01N 21/01* (2013.01); *G01N 21/21* (2013.01)

(58) Field of Classification Search
CPC ......... G01N 21/31; G01N 21/01; G01N 21/21
(Continued)

(56) References Cited

U.S. PATENT DOCUMENTS

| | | | | |
|---|---|---|---|---|
| 4,211,471 A | * | 7/1980 | Marie | G21B 1/23 359/352 |
| 5,920,393 A | * | 7/1999 | Kaplan | G01N 21/21 356/364 |
| 6,211,957 B1 | * | 4/2001 | Erdogan | G01J 4/04 356/364 |

OTHER PUBLICATIONS

Ramsay, J.V., "A Rapid-Scanning Fabry-Perot Interferometer with Automatic Parallelism Control," Appl. Opt. 1, 411 (1962).
(Continued)

*Primary Examiner* — Roy M Punnoose
(74) *Attorney, Agent, or Firm* — Nixon Peabody LLP

(57) ABSTRACT

A system comprises an electromagnetic radiation source, a polarizing element, a mode converter, an optical fiber, and a measurement device. The polarizing element receives electromagnetic radiation produced by the electromagnetic radiation source and outputs linearly-polarized electromagnetic radiation having a linear polarization angle $\theta_1$. The mode converter converts the linearly-polarized electromagnetic radiation to an orbital angular momentum (OAM) mode of linearly-polarized electromagnetic radiation with topological charge $L_i$. The OAM mode of linearly-polarized electromagnetic radiation is a superposition of first and second OAM modes with topological charges $L_i$ and opposite circular polarizations. The optical fiber supports propagation of the first and second OAM modes with an absolute effective index difference $\Delta n_{eff}$ greater than or equal to $5\times10^{-5}$, such that linearly-polarized electromagnetic radiation with linear polarization angle $\theta_2$ is emitted by the optical fiber. The measurement device is configured to determine a property of the electromagnetic radiation based on the polarization angle $\theta_2$.

20 Claims, 20 Drawing Sheets

(58) Field of Classification Search
USPC .......................................................... 356/364
See application file for complete search history.

(56) References Cited

OTHER PUBLICATIONS

Chen, Y.H., et al., "Determination of the secondary structures of proteins by circular dichroism and optical rotatory dispersion" Biochemistry. 11, 22 (1972).
Nesterov, A.V., and Niziev, V.G., "Laser beams with axially symmetric polarization," J. Phys. D 33 1817 (2000).
Klar, T.A., et al., "Breaking Abbe's diffraction resolution limit in fluorescence microscopy with stimulated emission depletion beams of various shapes," Phys. Rev. E 64, 066613 (2001).
Grier, D.G., "A revolution in optical manipulation" Nature 424 (6950):810-6 (2003).
Kuwata-Gonokami, M., et al., "Giant Optical Activity in Quasi-Two-Dimensional Planar Nanostructures," Phy. Rev. Lett. 95, 227401 (2005).
Bliokh, K.Y., "Geometrical Optics of Beams with Vortices: Berry Phase and Orbital Angular Momentum Hall Effect," Phys. Rev. Lett. 97, 043901 (2006).
Claborn, K., et al., "Optical rotation of achiral compounds," Angewandte Chemie International Edition, 47, 31 (2008).
Avenhaus, M., et al., "Fiber-assisted single-photon spectrograph," Opt. Lett. 34, 2873 (2009).
Ramachandran, et al., "Generation and propagation of radially polarized beams in optical fibers," Opt. Lett. 34, 2525 (2009).
Berkhout, G.C.G., et al., "Efficient Sorting of Orbital Angular Momentum States of Light," Phys. Rev. Lett. 105, 153601 (2010).
Omatsu, T., et al., "Metal microneedle fabrication using twisted light with spin," Opt. Express 18, 17967-17973 (2010).
Pedersen, M.E.V., et al., "Impact of the Scalar Approximation on the Prediction of the Group Velocity Dispersion." Jour, Lightwave Tech. 29, 3129 (2011).
Yao, A., and Padgett, M.J., "Orbital angular momentum: origins, behavior and applications," Adv. Opt. Photon. 3, 161-204 (2011).
Bozinovic, N., et al., "Control of orbital angular momentum of light with optical fibers," Opt. Lett. 37, 2451 (2012).
Gan, X., et al., "A high-resolution spectrometer based on a compact planar two dimensional photonic crystal cavity array," Appl. Phys. Lett. 100, 231104 (2012).
Bozinovic, N., et al., "Terabit-Scale Orbital Angular Momentum Mode Division Multiplexing in Fibers," Science 340, 1545-1548 (2013).
Mafu, M., et al., "Higher-dimensional orbital-angular-momentum-based quantum key distribution with mutually unbiased bases," Phys. Rev. A 88, 032305 (2013).
Redding, B., et al., "Compact spectrometer based on a disordered photonic chip," Nat. Photonics 7, 746 (2013).
Velasco, A.V., et al., "High-resolution Fourier-transform spectrometer chip with microphotonic silicon spiral waveguides,"Opt. Lett. 38, 706 (2013).
Xi, X.M., et al., "Optical Activity in Twisted Solid-Core Photonic Crystal Fibers," Phys. Rev. Lett. 110, 143903 (2013).
Karimi, E., et al., "Generating optical orbital angular momentum at visible wavelengths using a plasmonic metasurfaces," Light: Science & Applications 3, 167 (2014).
Krenn, M., et al., "Communication with spatially modulated light through turbulent air across Vienna," New J. Phys. 16 113028 (2014).
Redding, B., et al., "High-resolution and broadband all-fiber spectrometers," Optica 1, 175 (2014).
Gregg, P., et al., "Conservation of orbital angular momentum in air-core optical fibers," Optica 2, 267 (2015).
Ramachandran, S., et al., "On the scalability of ring fiber designs for OAM multiplexing," Opt. Express 23, 3721 (2015).
Wan, N., et al., "High-resolution optical spectroscopy using multimode interference in a compact tapered fibre," Nat. Comm. 6, 7762 (2015).
Gregg, P., et al., "13.4km OAM state propagation by recirculating fiber loop," Opt. Express 24, 17 (2016).
Konishi, T., et al., "Super spectral resolution beyond pixel Nyquist limits on multi-channel spectrometer," Opt. Express 24, 26583 (2016).
Tischler, N., et al., "Quantum optical rotatory dispersion," Sci. Adv. 2, 10 e1601306 (2016).
Willner, A.E., et al., "Orbital-angular-momentum-based reconfigurable optical switching and routing," Photon. Res. 4, B5-B8 (2016).
French, R., et al., "Speckle-based hyperspectral imaging combining multiple scattering and compressive sensing in nanowire mats," Opt. Lett. 42, 1820 (2017).
Metzger, N.K., et al., "Harnessing speckle for a sub-femtometre resolved broadband wavemeter and laser stabilization," Nat. Comm. 8, 15610 (2017).
Vitullo, D.L.P., et al., "Observation of Interaction of Spin and Intrinsic Orbital Angular Momentum of Light" Phys. Rev. Lett. 118, 083601 (2017).
Dey, A., and Yarlagadda, S., "Temperature dependence of long coherence times of oxide charge qubits," Scientific Reports 8, 3487 (2018).
Gregg, P., et al., "Enhanced spin orbit interaction of light in highly confining optical fibers for mode division multiplexing," Nat. Comm. 10, 4707 (2019).
Johnson, S., et al., "Measurement of the spin-orbit coupling interaction in ring-core optical fibers," OSA Continuum 2, 2975-2982 (2019).
Liang, Y., et al., "Generation of a double-ring perfect optical vortex by the Fourier transform of azimuthally polarized Bessel beams," Opt. Lett. 44, 1504-1507 (2019).

* cited by examiner

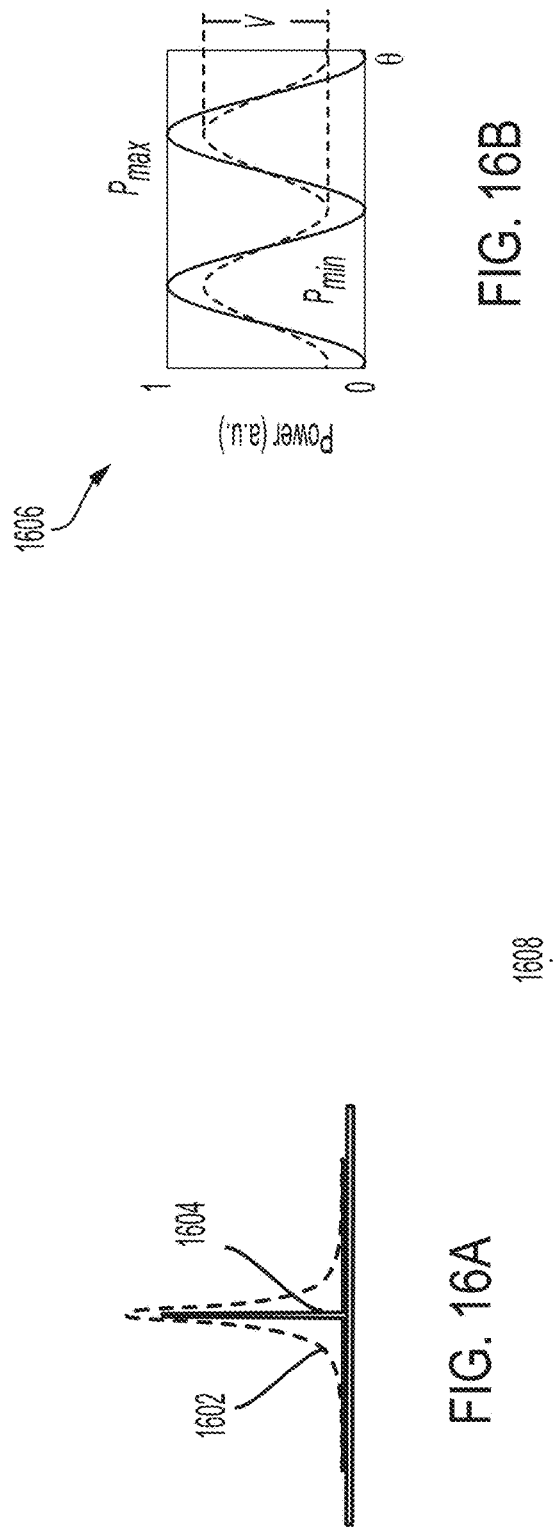
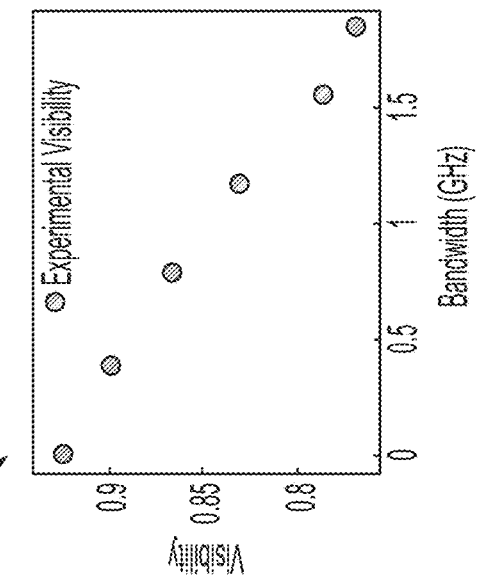
FIG. 16A
FIG. 16B
FIG. 16C

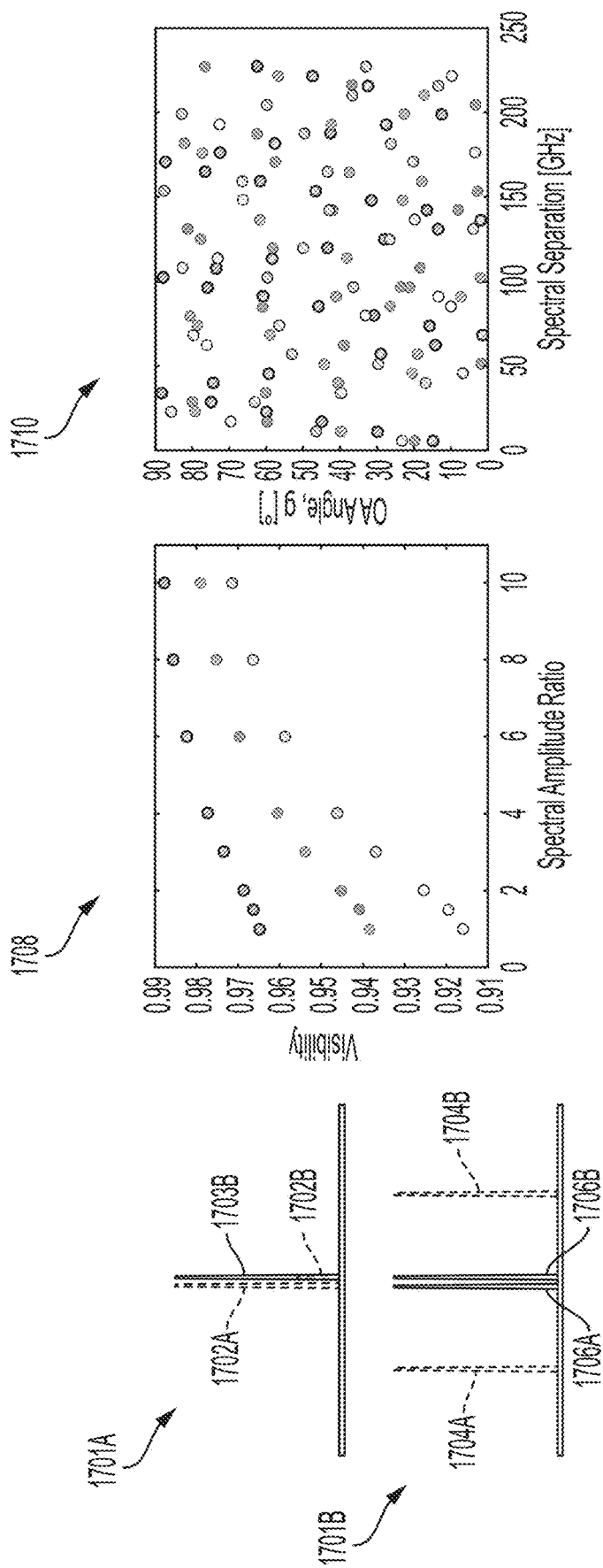

ENGINEERED OPTICAL FIBERS AND USES THEREOF

CROSS-REFERENCE TO RELATED APPLICATIONS

This application claims the benefit of and priority to U.S. Provisional Patent Application Ser. No. 62/842,895, filed on May 3, 2019, entitled "ENGINEERED OPTICAL FIBERS AND USES THEREOF," which is hereby incorporated by reference herein in its entirety.

STATEMENT REGARDING FEDERALLY SPONSORED RESEARCH OR DEVELOPMENT

This invention was made with government support under Grant No. DE-SC0012704 awarded by the Department of Energy, Grant No. FA9550-14-1-0165 awarded by Air Force Office of Scientific Research, Grant No. N00014-13-1-0627 awarded by the Department of the Navy, and Grant No. ECCS-1610190 awarded by the National Science Foundation. The government has certain rights in the invention.

TECHNICAL FIELD

The present disclosure relates to optical fibers used for measuring the wavelength of an optical signal. Specifically, the present disclosure relates to optical fibers configured to support stable propagation of orbital angular momentum modes of an optical signal over long distances to measure optical activity in the optical signal.

BACKGROUND

Wavelength measurement devices, such as wavemeters or spectrometers with high resolving power $R=\lambda/\Delta\lambda$ (where $\lambda$ is the general wavelength around which the device is operating, and $\Delta\lambda$ is the resolution of the device), are of great utility to a variety of fields such as high-precision spectroscopy, atomic-line measurements etc. Such devices can be broadly divided into two categories: scanning devices where different wavelengths are sequentially mapped to a detector (e.g. grating based spectrometers, Fabry-Perot interferometers), and "single-shot" devices which project different wavelengths to different pixels of a sensor array. While scanning devices are inherently slow and mechanical, they can yield very high resolving powers $R>10^6$, whereas single-shot measurements are fast but are limited in resolving powers to about $R>10^4$, and don't operate well at low light levels. Thus, new devices are needed that are fast, but have high resolutions and operate well at low light levels.

SUMMARY

According to some aspects of the present disclosure, a system for measuring a property of electromagnetic radiation comprises an electromagnetic radiation source, a polarizing element, a mode converter, an optical fiber, and one or more measurement devices. The electromagnetic radiation source is configured to produce electromagnetic radiation. The polarizing element is configured to receive the electromagnetic radiation produced by the electromagnetic radiation source and output linearly-polarized electromagnetic radiation having a linear polarization angle $\theta_1$. The mode converter is configured to receive the linearly-polarized electromagnetic radiation and output an orbital angular momentum (OAM) mode of linearly-polarized electromagnetic radiation with a topological charge $L_i$. The OAM mode of linearly-polarized electromagnetic radiation is a superposition of (i) a first OAM mode with topological charge $L_i$ and a first circular polarization, and (ii) a second OAM mode with topological charge $L_i$ and a second circular polarization. The first circular polarization is opposite from the second circular polarization. The optical fiber is configured to receive the first OAM mode and the second OAM mode, and support propagation to an output of the optical fiber of the first OAM mode with an effective index $n_{eff1}$ and the second OAM mode with an effective index $n_{eff2}$. An absolute difference $\Delta n_{eff}$ between $n_{eff1}$ and $n_{eff2}$ is greater than or equal to $5\times10^{-5}$, such that linearly-polarized electromagnetic radiation having a topological charge $L_i$ and a linear polarization angle $\theta_2$ is emitted at the output of the optical fiber. The one or more measurement devices are configured to determine the property of the electromagnetic radiation based at least on the polarization angle $\theta_2$ of the electromagnetic radiation emitted at the output of the optical fiber.

According to some aspects of the present disclosure, a method for measuring a property of electromagnetic radiation comprises: emitting electromagnetic radiation from an electromagnetic radiation source; converting the electromagnetic radiation to linearly-polarized electromagnetic radiation having a polarization angle $\theta_1$; converting the linearly-polarized electromagnetic radiation into a first orbital angular momentum (OAM) mode of linearly-polarized electromagnetic radiation with a topological charge $L_1$, the OAM mode of linearly-polarized electromagnetic radiation being a superposition of (i) a first OAM mode with topological charge $L_1$ and a first circular polarization, and (ii) a second OAM mode with topological charge $L_1$ and a second circular polarization, the first circular polarization being opposite from the second circular polarization; causing (i) the first OAM mode of linearly-polarized electromagnetic radiation to propagate through an optical fiber with an effective index $n_{eff1}$, and (ii) the second OAM mode of linearly-polarized electromagnetic radiation to propagate through the optical fiber with an effective index $n_{eff2}$, an absolute difference $\Delta n_{eff}$ between $n_{eff1}$ and $n_{eff2}$ being greater than or equal to $5\times10^{-5}$, such that linearly-polarized electromagnetic radiation having a topological charge $L_1$ and a linear polarization angle $\theta_2$ is emitted at the output of the optical fiber; and determining the property of the produced electromagnetic radiation based at least on the linear polarization angle $\theta_2$.

According to some aspects of the present disclosure, the method further comprises: converting the linearly-polarized electromagnetic radiation into a second OAM mode of linearly-polarized electromagnetic radiation with a topological charge $L_2$, the additional OAM mode of linearly-polarized electromagnetic radiation being a superposition of (i) a third OAM mode with topological charge $L_2$ and the first circular polarization, and (ii) a fourth OAM mode with topological charge $L_2$ and the second circular polarization; causing the third OAM mode and the fourth OAM mode to propagate through the optical fiber with the first OAM mode and the second OAM mode such that the linearly-polarized electromagnetic radiation emitted at the output of the optical fiber includes (i) linearly-polarized electromagnetic radiation having the topological charge $L_1$ and the linear polarization angle $\theta_2$ and (ii) linearly-polarized electromagnetic radiation having the topological charge $L_2$ and the linear polarization angle $\theta_3$; and determining the property of the produced electromagnetic radiation based at least on the linear polarization angle $\theta_2$ and the linear polarization angle $\theta_3$.

In some aspects of the present disclosure, the method further comprises: converting the linearly-polarized electromagnetic radiation into a third OAM mode of linearly-polarized electromagnetic radiation with a topological charge $L_2$, the additional OAM mode of linearly-polarized electromagnetic radiation being a superposition of (i) a fifth OAM mode with topological charge $L_3$ and the first circular polarization, and (ii) a sixth OAM mode with topological charge $L_3$ and the second circular polarization; causing the fifth OAM mode and the sixth OAM mode to propagate through the optical fiber with the first OAM mode, the second OAM mode, the third OAM mode, and the fourth OAM mode such that the linearly-polarized electromagnetic radiation emitted at the output of the optical fiber includes (i) linearly-polarized electromagnetic radiation having the topological charge $L_1$ and the linear polarization angle $\theta_2$, (ii) linearly-polarized electromagnetic radiation having the topological charge $L_2$ and the linear polarization angle $\theta_3$, and (iii) linearly-polarized electromagnetic radiation having the topological charge $L_3$ and the linear polarization angle $\theta_4$; and determining the property of the produced electromagnetic radiation based at least on the linear polarization angle $\theta_2$, the linear polarization angle $\theta_3$, and the linear polarization angle $\theta_4$.

According to some aspects of the present disclosure, the method further comprises: causing, after being emitted at the output of the optical fiber, the first OAM mode of linearly-polarized electromagnetic radiation, the second OAM mode of linearly-polarized electromagnetic radiation, and the third OAM mode of linearly-polarized electromagnetic radiation pass through a rotatable polarizing element as the rotatable polarizing element rotates; measuring a maximum power and a minimum power of the first OAM mode of linearly-polarized electromagnetic radiation passing through the rotatable polarizing element; measuring a maximum power and a minimum power of the second OAM mode of linearly-polarized electromagnetic radiation passing through the rotatable polarizing element; measuring a maximum power and a minimum power of the third OAM mode of linearly-polarized electromagnetic radiation passing through the rotatable polarizing element; determining a visibility for each of the first OAM mode, the second OAM mode, and the third OAM mode, based at least on the maximum and minimum power of each of the first OAM mode, the second OAM mode, and the third OAM mode passing through the rotatable polarizing element; and determining a spectral bandwidth of the emitted electromagnetic radiation based at least on the determined visibility for each of the first OAM mode, the second OAM mode, and the third OAM mode.

According to some aspects of the present disclosure, a system for measuring a linear polarization angle of electromagnetic radiation comprises an electromagnetic radiation source, a polarizing element, a mode converter, an optical fiber, and a rotatable polarizing element. The electromagnetic radiation source is configured to produce electromagnetic radiation. The polarizing element is configured to receive the electromagnetic radiation produced by the electromagnetic radiation source and output linearly-polarized electromagnetic radiation having a linear polarization angle $\theta_1$. The mode converter is configured to receive the linearly-polarized electromagnetic radiation and output an orbital angular momentum (OAM) mode of linearly-polarized electromagnetic radiation with a topological charge $L_i$. The OAM mode of linearly-polarized electromagnetic radiation is a superposition of (i) a first OAM mode with topological charge $L_1$ and a first circular polarization, and (ii) a second OAM mode with topological charge $L_1$ and a second circular polarization. The first circular polarization is opposite from the second circular polarization. The optical fiber is configured to receive the first OAM mode and the second OAM mode, and support propagation to an output of the optical fiber of the first OAM mode with an effective index $n_{eff1}$ and the second OAM mode with an effective index $n_{eff2}$. An absolute difference $\Delta n_{eff}$ between $n_{eff1}$ and $n_{eff2}$ is greater than or equal to $5 \times 10^{-5}$, such that linearly-polarized electromagnetic radiation having a topological charge $L_i$ and a linear polarization angle $\theta_2$ is emitted at the output of the optical fiber. The rotatable polarizing element is configured to allow a maximum amount of the linearly-polarized electromagnetic radiation emitted at the output of the optical fiber to pass when a rotation angle of the rotatable polarizing element matches the linear polarization angle $\theta_2$.

According to some aspects of the present disclosure, a system for measuring a linear polarization angle of electromagnetic radiation comprises an electromagnetic radiation source, a polarizing element, a mode converter, an optical fiber, and a polarimeter. The electromagnetic radiation source is configured to produce electromagnetic radiation. The polarizing element is configured to receive the electromagnetic radiation produced by the electromagnetic radiation source and output linearly-polarized electromagnetic radiation having a linear polarization angle $\theta_1$. The mode converter is configured to receive the linearly-polarized electromagnetic radiation and output an orbital angular momentum (OAM) mode of linearly-polarized electromagnetic radiation with a topological charge $L_i$. The OAM mode of linearly-polarized electromagnetic radiation is a superposition of (i) a first OAM mode with topological charge $L_i$ and a first circular polarization, and (ii) a second OAM mode with topological charge $L_i$ and a second circular polarization. The first circular polarization is opposite from the second circular polarization. The optical fiber is configured to receive the first OAM mode and the second OAM mode, and support propagation to an output of the optical fiber of the first OAM mode with an effective index $n_{eff1}$ and the second OAM mode with an effective index $n_{eff2}$. An absolute difference $\Delta n_{eff}$ between $n_{eff1}$ and $n_{eff2}$ is greater than or equal to $5 \times 10^{-5}$, such that linearly-polarized electromagnetic radiation having a topological charge $L_i$ and a linear polarization angle $\theta_2$ is emitted at the output of the optical fiber. The polarimeter is configured to receive the linearly-polarized electromagnetic radiation emitted at the output of the optical fiber and measure the linear polarization angle $\theta_2$.

The above summary is not intended to represent each implementation or every aspect of the present disclosure. Additional features and benefits of the present disclosure are apparent from the detailed description and figures set forth below.

BRIEF DESCRIPTION OF THE DRAWINGS

The disclosure will be better understood from the following description of example implementations together with reference to the accompanying drawings.

FIG. 16A is a comparison of a broadband spectrum of electromagnetic radiation and a narrow spectrum of electromagnetic radiation, according to aspects of the present disclosure;

FIG. 16B is a plot of measure power versus polarization angle, according to aspects of the present disclosure;

FIG. 16C is a plot of the visibility of the system of FIG. 1 versus the bandwidth of the electromagnetic radiation being measured, according to aspects of the present disclosure;

FIG. 17A is plot of the spectral amplitude and the spectral separation of a complex spectrum being modified, according to aspects of the present disclosure;

FIG. 17B is a plot of the visibility of the system of FIG. 1 versus the spectral amplitude ratio of the spectrum of FIG. 17A, according to aspects of the present disclosure; and FIG. 17C is a plot of optical activity angle measured using the system of FIG. 1 versus the spectral separation of the spectrum of FIG. 17A, according to aspects of the present disclosure.

Figure 1:
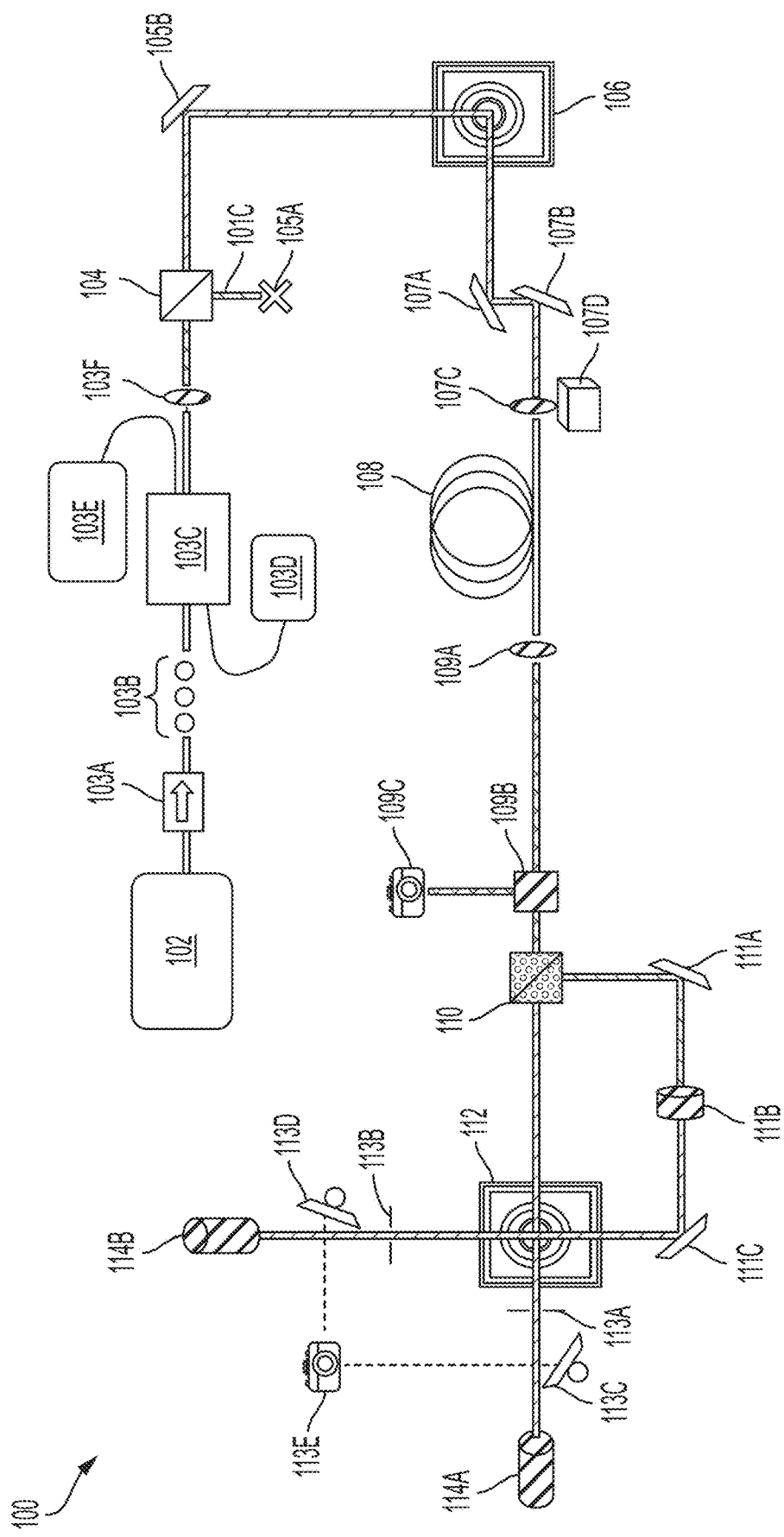
FIG. 1 is a first system for measuring a property of electromagnetic radiation, according to aspects of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

While the present disclosure is susceptible of many different forms, there is shown in the drawings and will herein be described in detail example implementations of the present disclosure, with the understanding that the present disclosure is to be considered as an example of the principles of the present disclosure and is not intended to limit the broad aspect of the present disclosure to the illustrated implementations.

Disclosed herein are techniques for measuring properties of electromagnetic radiation that rely on optical activity undergone by the electromagnetic radiation as it propagates through a system. Optical activity is an inherent property of chiral materials (such as sugar water), where the polarization angle of linearly-polarized light input into the material rotates as it propagates down the material. The amount of rotation is based at least in part on the wavelength of the electromagnetic radiation. Thus, by measuring this rotation, properties of the material (such as the material's concentration or the wavelength of the electromagnetic radiation) can be determined.

FIG. 1 shows a system 100 for measuring a property of electromagnetic radiation that relies on the optical activity of the electromagnetic radiation. However, instead of using a chiral material, system 100 relies on the optical activity exhibited by orbital angular momentum (OAM) modes of the electromagnetic radiation in optical fibers. By measuring the polarization angle of the electromagnetic radiation that is emitted by the optical fiber and comparing that to the polarization angle of the electromagnetic radiation when entering the optical fiber, the amount of rotation imparted to the electromagnetic radiation can be measured. In turn, a variety of different properties of the electromagnetic radiation can be determined based on this measurement.

System 100 includes a variety of different optical components through which electromagnetic radiation propagates. Generally, the components can be coupled via any suitable mechanism, such as via optical fibers; a tabletop setup of lenses, mirrors, etc.; or any suitable device, technique, etc. Components that are coupled together are arranged so that electromagnetic radiation that is emitted from one component is received at the other component.

System 100 includes an electromagnetic radiation source 102 that produces electromagnetic radiation. In use, the electromagnetic radiation source 102 can be any object or component that produces the electromagnetic radiation that is being measured, based on the specific application for which system 100 is being used. For example, the electromagnetic radiation source 102 could be a tissue sample, one or more components reacting to produce electromagnetic radiation (such as visible light infrared light, ultraviolet light, etc.), an optical component designed to produce electromagnetic radiation, etc. In applications designed to test and/or characterize the performance of system 100, the electromagnetic radiation source 102 can be a tunable laser, or a narrow linewidth laser source, such as an external cavity laser.

System 100 further includes a polarizing element 104 configured to receive the electromagnetic radiation from the electromagnetic radiation source 102. The polarizing element 104 is configured to convert the electromagnetic radiation emitted by the electromagnetic radiation source 102 to a single linear polarization having a polarization angle $\theta_1$. In some implementations, $\theta_1$ is 0°, e.g., the electromagnetic radiation emitted from the polarizing element 104 is linearly polarized along the $\hat{x}$ direction. Generally however, any angle can be used for $\theta_1$, as this polarization angle will be used as a reference to compare to after the electromagnetic radiation propagates through the optical fiber. The polarizing element 104 can be any suitable device or mechanism that creates linearly polarized light, such as an absorptive polarizer, a beam-splitting polarizer (which could include polarization by Fresnel reflection, birefringent polarizers, thin film polarizers, wire-grid polarizer, etc.), or any linear polarizer.

System 100 can optionally include a variety of components optically coupled between the electromagnetic radiation source 102 and the polarizing element 104, depending on the application of system 100. These components can include an optical isolator 103A, a polarization controller 103B, a 3 dB coupler 103C, an optical spectrum analyzer 103D, a Fabry-Perot interferometer 103E, and a lens 103F. The optical isolator 103A is used to prevent back-reflections of electromagnetic radiation back into the electromagnetic radiation source 102. The polarization controller 103B can be used to control the amount of input power that the electromagnetic radiation emitted from the polarizing element 104 has. In some implementations, the polarization controller 103B receives unpolarized electromagnetic radiation from the electromagnetic radiation source 102, and converts the unpolarized electromagnetic radiation to linearly-polarized electromagnetic radiation at an arbitrary angle.

The 3 dB coupler 103C is used to couple the output of the polarization controller 103B to each of the optical spectrum analyzer 103D, the Fabry-Perot interferometer 103E, and the lens 103F. The 3 dB coupler 103C thus splits the electromagnetic radiation into three separate channels. While a 3 dB coupler is shown, any type of coupler could be used. In applications where the system 100 (or any component of system 100) is being tested, the optical spectrum analyzer 103D and the Fabry-Perot interferometer 103E can be used to independently measure the wavelength of the electromagnetic radiation. These results can be compared to the output of the system 100, in order to validate the system 100. In some implementations, the optical spectrum analyzer 103D can be used to provide a lower-resolution absolute measurement of the electromagnetic radiation from the electromagnetic radiation source 102. In some implementations, the Fabry-Perot interferometer 103E can be used to provide a higher-resolution relative measurement of the electromagnetic radiation from the electromagnetic radiation source 102 relative to a reference wavelength. Finally, the lens 103F is used to focus the electromagnetic radiation onto the polarizing element 104.

The linearly-polarized electromagnetic radiation emitted from the polarizing element 104 propagates to a mode converter 106 that is coupled to the polarizing element 104. A beam trap 105A can be optically coupled to the polarizing element 104 to absorb all of the other polarizations of the electromagnetic radiation emitted by the electromagnetic radiation source 102. A number of optical components, such as mirror 105B, can be used to direct the linearly-polarized electromagnetic radiation to the mode converter 106.

The mode converter 106 converts the linearly-polarized electromagnetic radiation from the polarizing element 104 into an orbital angular momentum (OAM) mode. The mode converter 106 can be any suitable component that can create the OAM mode, such as a spatial light modulator, a q-plate, a fiber grating, a spiral phase plate, a metasurface, or any combination thereof. In some implementations, the mode converter 106 has a fork-pattern hologram. An OAM mode is any mode where the electromagnetic radiation has an angular momentum component that is dependent on the field spatial distribution of the electromagnetic radiation. The OAM modes of electromagnetic radiation can also have a component of angular momentum that is dependent on the polarization of the electromagnetic radiation.

Generally, OAM modes of electromagnetic radiation are characterized by helical wavefronts with an optical vortex at the center. The amount of OAM possessed by the electromagnetic radiation can be described by its topological charge L, which is a positive or negative integer. The topological charge of an OAM mode is a discretized representation of the spatial field distribution of that OAM mode. Electromagnetic radiation with a topological charge L=0 has no OAM. The electromagnetic radiation in this mode is not helical, and the wavefronts are simply a series of continuously phase-constant surfaces. The wavefronts of electromagnetic radiation with a topological charge L=±1 are shaped as a single helical surface, with a step length equal to the wavelength λ of the electromagnetic radiation. The wavefronts of electromagnetic radiation with a topological charge L=±2 are shaped as a |L| distinct but intertwined helices, with the step length of each helical surface equal to |L|×λ. The OAM mode of linearly-polarized electromagnetic radiation emitted from the mode converter 106 can have a topological charge $L_i$, which can generally be any positive integer greater than zero, or negative integer less than zero.

The mode converter 106 outputs the OAM mode of the linearly-polarized electromagnetic radiation to an optical fiber 108. As the electromagnetic radiation propagates through the optical fiber 108, the polarization angle of the electromagnetic radiation rotates. The optical fiber 108 causes the polarization angle to rotate, because the electromagnetic radiation with topological charge $L_i$ and with linear polarization is a superposition of two different non-degenerate OAM modes. Each of these two OAM modes have the same topological charge $L_i$ (which is also the same as the linearly-polarized electromagnetic radiation), but have opposing circular polarizations. Thus, one of the two OAM modes is left-handed circular polarized, while the other OAM mode is right-handed circular polarized. The optical fiber 108 thus receives the two different circularly-polarized OAM modes and supports propagation of the circularly-polarized OAM modes to the output of the optical fiber 108. The superposition of these two OAM modes is linearly-polarized electromagnetic radiation which enters the optical fiber 108 with a polarization angle of $\theta_1$ and a topological charge $L_i$. Because this electromagnetic radiation is the superposition of (i) left-handed circularly polarized electromagnetic radiation having topological charge $L_i$ and (ii) right-handed circularly polarized electromagnetic radiation having topological charge $L_i$, the polarization angle of the electromagnetic radiation in the optical fiber 108 will rotate.

Figure 2B:
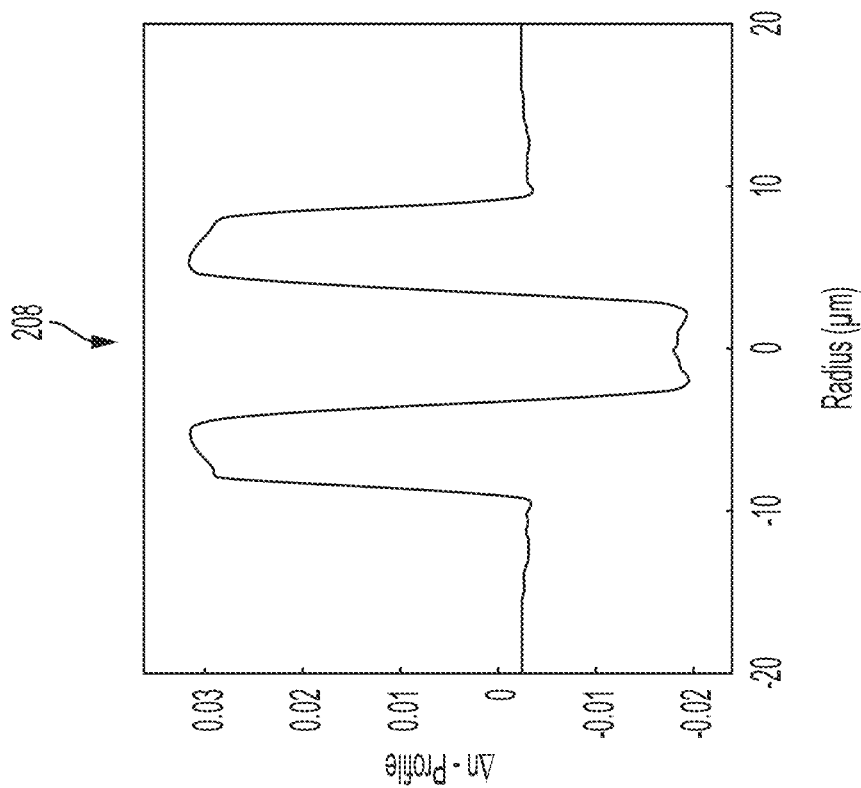
FIG. 2B is a refractive index profile of the optical fiber of FIG. 2A, according to aspects of the present disclosure.
Figure 2A:
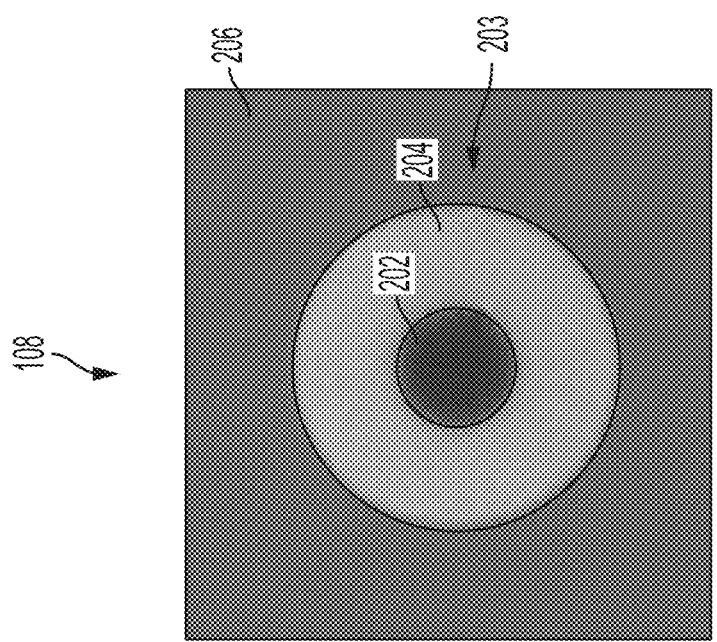
FIG. 2A is a cross-section of an optical fiber for use with the system of FIG. 1, according to aspects of the present disclosure.

Referring to FIGS. 2A and 2B, in one implementation, the optical fiber 108 is a ring-core fiber that is formed from a ring-core 203, and an outer cladding layer 206 that surrounds the ring-core 203. The ring-core 203 has an annular body 204 and a hollow (e.g., air-filled) center 202. The ring-core 203 guides the two circularly-polarized OAM modes through the optical fiber 108. In one implementation, the ring-core 203 is formed from germanium-doped silicon dioxide, and the cladding layer 206 is formed from silicon dioxide (also referred to as silica). The refractive index profile 208 of the optical fiber 108 is shown in FIG. 2B. The vertical axis measures $\Delta n$, which is the difference between the refractive index of the material relative to the refractive index of standard silicon dioxide/silica. The horizontal axis measures the radial distance through the center of the optical fiber 108. As is shown, the refractive index of the annular body 204 of ring-core 203 is generally higher than the refractive indices of both the hollow center 202 of the ring-core 203, and the cladding layer 206. Other implementations can use other designs for the optical fiber 108, such as by using different materials or by having different refractive index profiles. For example, in some implementations, the optical fiber 108 can have a low index center layer instead of the hollow center. Generally, any design can be used for the optical fiber 108, so long as the optical fiber 108 supports propagation of the circularly-polarized OAM modes.

Figure 3A:
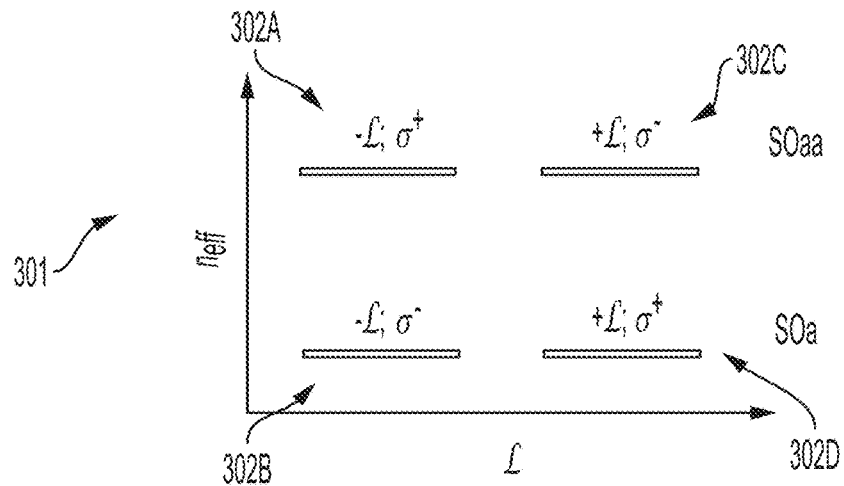
FIG. 3A is a plot of the effective index of spin-orbit aligned modes and spin-orbit anti-aligned modes, according to aspects of the present disclosure.
Figure 3B:
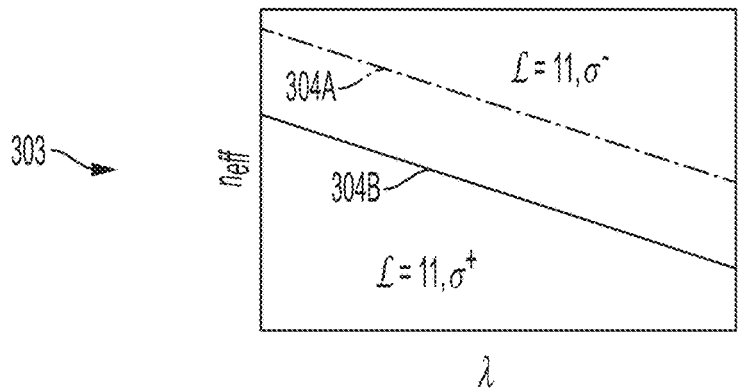
FIG. 3B is a plot of the effective index difference between a spin-orbit aligned mode and a spin-orbit anti aligned mode, according to aspects of the present disclosure.
Figure 3C:
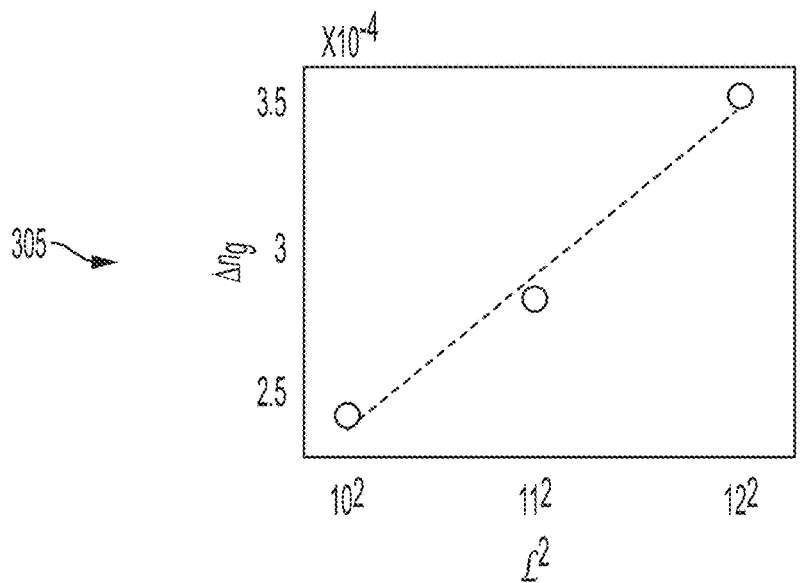
FIG. 3C is a plot of the group index difference between a spin-orbit aligned mode and a spin-orbit anti-aligned mode and the square of the topological charge of the modes, according to aspects of the present disclosure.

Referring now to FIGS. 3A, 3B, and 3C, the optical fiber 108 imparts rotation to the polarization of the propagating electromagnetic radiation, because the two circularly-polarized OAM modes have different effective indices $n_{eff}$ within the optical fiber 108. The effective index $n_{eff}$ of any given mode is a measure of how fast the phase of the electromagnetic radiation within that mode propagate within the optical fiber 108. The effective index $n_{eff}$ generally describes the phase velocity of the OAM mode in the optical fiber 108. However, system 100 is generally a dispersive system, and thus generally has some amount of wavelength-dependent chromatic dispersion, e.g., the effective index of a mode changes with wavelength. As such, pulses of electromagnetic radiation traveling in OAM modes in the optical fiber 108 generally form envelopes that propagate through the optical fiber 108 at a velocity described by a group index $n_g$. The group index $n_g$ is generally related to the effective index $n_{eff}$ according to $$n_g = n_{eff} - \lambda \frac{dn_{eff}}{d\lambda}.$$

FIG. 3A shows a plot 301 illustrating the different effective indices $n_{eff}$ for four different OAM modes of electromagnetic radiation. The vertical axis shows the effective index $n_{eff}$, while the horizontal measure shows the topological charge L, which is a measure of how much OAM each mode carries. The four OAM modes are categorized by their topological charge L, as well as by whether the OAM mode is left-handed circularly polarized ($\sigma^+$) or right-handed circularly polarized ($\sigma^-$). OAM mode 302A has a topological charge $-L$ and a circular polarization $\sigma^+$. OAM mode 302B has a topological charge $-L$ and a circular polarization $\sigma^-$. OAM mode 302C has a topological charge $+L$ and a circular polarization $\sigma^-$. OAM mode 302D has a topological charge $+L$ and a circular polarization $\sigma^+$. The expression of the electric fields of these four OAM modes has the following form:

$$\vec{E}(r, T\phi) = F(r) \begin{Bmatrix} e^{\pm iL\phi}\sigma^\pm \\ e^{\mp iL\phi}\sigma^\pm \end{Bmatrix}$$

F(r) is the radial field, which can be the same for each mode. The $e^{\pm iL\phi}$ and $e^{\pm iL\phi}$ terms refer to the azimuthal component of the field distribution of the modes due to OAM. The $\sigma^\pm$ terms refer to the circular polarization and respective handedness of the OAM modes. The two OAM modes with the same sign or handedness of topological charge L and polarization $\sigma$ (the top branch of the above equation) are referred to as spin-orbit aligned modes. The two OAM modes with the opposite sign or handedness of topological charge L and polarization $\sigma$ (the bottom branch of the above equation) are referred to as spin-orbit anti-aligned modes. As can be seen, the two spin-orbit aligned modes (OAM modes 302B and 302D) have the same effective index $n_{eff}$, which is different than the effective index of the two spin-orbit anti-aligned modes (OAM modes 302A and 302C). Thus, by simultaneously exciting one spin-orbit aligned mode and one spin-orbit anti-aligned modes in the optical fiber 108 (whose polarizations add to become linear polarization), the optical fiber 108 will have two modes with different effective indices propagating therein.

FIG. 3B shows a plot 303 of the effective index $n_{eff}$ of two different example OAM modes versus the wavelength $\lambda$. In the example, OAM mode 304A has a topological charge $L=11$ and a polarization $\sigma^-$, while OAM mode 304B has a topological charge $L=11$ and a polarization $\sigma^+$. As is shown, the effective indices $n_{eff}$ of the two example OAM modes 304A, 304B are different from each other, and are dependent on the wavelength $\lambda$. This difference in effective indices between the two OAM modes corresponds to a difference in the group indices between the two OAM modes, which in turn causes the linearly-polarized electromagnetic radiation formed from the superposition of the two OAM modes to rotate as it propagates through the optical fiber 108.

In some implementations, the minimum absolute difference between the effective indices of the two OAM modes for use with system 100 is $\Delta n_{eff}=|n_{eff1}-n_{eff2}|=5\times10^{-5}$. Generally, if the non-degeneracy condition of the effective indices of the two OAM modes is met, the system 100 is minimally dispersive, then the minimum difference $\Delta n_g$ in the group indices is also about $5\times10^{-5}$. By exciting two OAM modes with at least this absolute difference in effective indices, the group index difference $\Delta n_g$ between the two modes is sufficient to impart a detectable amount of rotation to the electromagnetic radiation. This minimum value for $\Delta n_{eff}$ also substantially prohibits any coupling between the two OAM modes due to external perturbations, such as via temperature or mechanical fluctuations. By increasing the effective index difference $\Delta n_{eff}$, the group index difference $\Delta n_g$ is increased, which enables system 100 to achieve higher wavelength resolutions, e.g., the smallest detectable wavelength different between two beams of electromagnetic radiation is lower. Generally, any optical fiber that can achieve an effective index difference that is greater than or equal $5\times10^{-5}$ can stably guide the two different OAM modes.

In the illustrated implementation, the effective index $n_{eff}$ of the two spin-orbit anti-aligned OAM modes is greater than the effective index $n_{eff}$ of the two spin-orbit aligned OAM modes. However, in other implementations, the optical fiber 108 can be designed so that the effective index $n_{eff}$ of the two spin-orbit anti-aligned OAM modes is less than the effective index $n_{eff}$ of the two spin-orbit aligned OAM modes. Generally, so long as the spin-orbit aligned OAM modes and the spin-orbit anti-aligned OAM modes have different values for their respective effective indices $n_{eff}$, the spin-orbit aligned and spin-orbit anti-aligned modes can be used with system 100.

FIG. 3C shows a plot 305 of $\Delta n_g$ versus the square of the topological charge L, for two OAM modes with different effective indices in an exemplary ring-core optical fiber, such as optical fiber 108. As is shown, $\Delta n_g$ scales as $L^2$ in the exemplary ring-core optical fiber. In other implementations of the optical fiber that support stable propagation of the OAM modes, $\Delta n_g$ may scale as $L^3$. In general, the exact dependence of $\Delta n_g$ on L can vary. For example, $\Delta n_g$ could scale as $L^n$ (L to the $n^{th}$ power), or with other dependences on L. Generally however, $\Delta n_g$ always increases monotonically with L. Thus, $\Delta n_g$ can be increased by increasing the topological charge L of the OAM modes that are propagating through the optical fiber 108, which in turn increases the wavelength resolution of the system 100. The mode converter 106 can be used to convert the electromagnetic radiation output from the electromagnetic radiation source 102 to higher OAM modes, which in turn increases the group index difference $\Delta n_g$ between the two OAM modes.

Generally, optical fiber 108 is cylindrically symmetric and isotropic, and is designed to mirror the field profile of the OAM modes. In turn, this mirroring maximizes the effective index difference $\Delta n_{eff}$ between the spin-orbit aligned mode and the spin-orbit anti-aligned mode. The effective index difference $\Delta n_{eff}$ can be due at least in part to the inhomogeneity of the ring-core, which introduces polarization-dependent perturbations based on the polarization of the OAM modes. The perturbations are enhanced by the OAM of the electromagnetic radiation.

Referring back to FIG. 1, in some implementations, system 100 includes mirrors 107A and 107B to direct the OAM mode of the linearly-polarized electromagnetic radiation to a lens 107C mounted on a six-axis stage 107D. The lens 107C and the six-axis stage 107D is used to precisely couple the two OAM modes output by the mode converter 106 to an input of the optical fiber 108, in order to reduce modal cross-talk. In some implementations, walk-the-beam methods are used for optical alignment. In some implementations, a >20 dB mode purity is obtained between the two desired OAM modes and any other modes that may have inadvertently been excited in the optical fiber 108.

Figure 4:
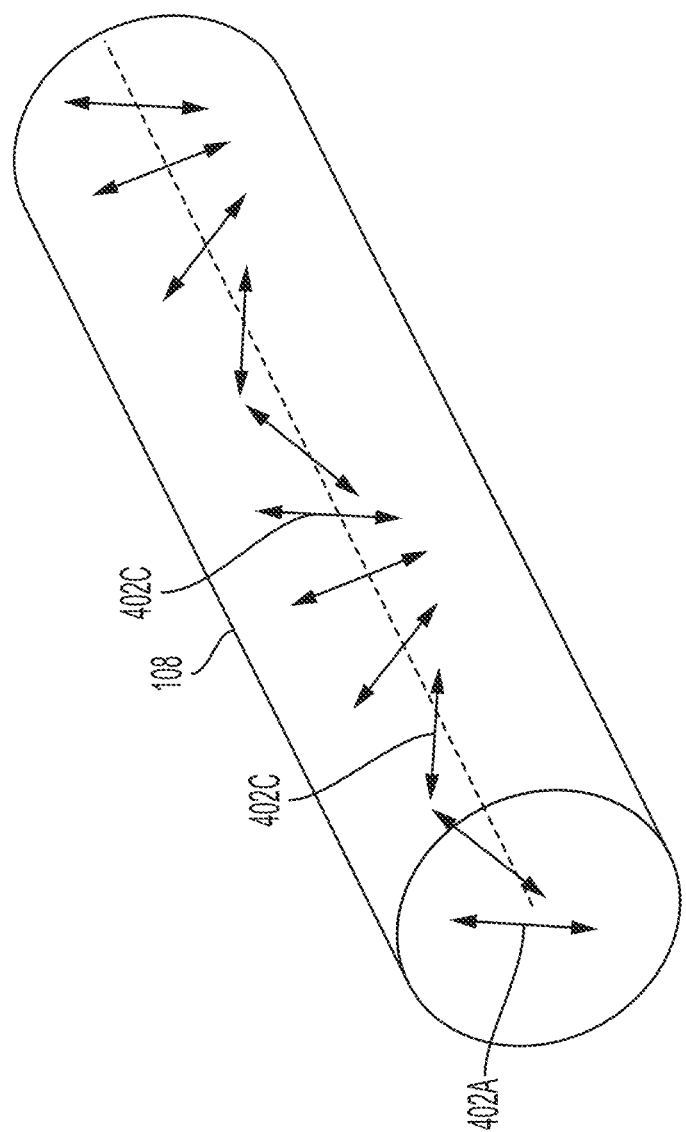
FIG. 4 is an image of the rotation of the polarization angle of a beam of electromagnetic radiation as the beam of electromagnetic radiation propagates through an optical fiber, according to aspects of the present disclosure.

As the two OAM modes travel through the optical fiber 108, the two modes propagate at different speeds due to their effective index difference. Because a single linearly-polarized OAM mode is the superposition of the two circularly-polarized OAM modes, the result is that the polarization angle of the linearly-polarized electromagnetic radiation rotates as the electromagnetic radiation travels through the optical fiber 108. This rotation is shown in FIG. 4, which is a graphical representation of the orientation of polarization of the linearly-polarized electromagnetic radiation as it propagates through a section of the optical fiber 108. In the illustrated implementation, the electromagnetic radiation begins having a generally vertical polarization angle, shown by arrow 402A. However, the initial polarization angle of the electromagnetic radiation can generally be at any angle, so long as the electromagnetic radiation is linearly polarized. As the electromagnetic radiation propagates through optical fiber 108, the polarization angle begins to rotate. For example, arrow 402B shows that the polarization of the electromagnetic radiation is nearly horizontal, while arrow 402C shows that the polarization of the electromagnetic radiation has rotated back to vertical. The propagating beam of electromagnetic radiation is described as $$\vec{E}(r,\phi)=F(r)\exp(iL\phi)\exp(i\bar{\beta}z)[\sigma^+\exp(i\gamma)+\sigma^-\exp(-i\gamma)]$$

$$\to \vec{E}(r,\phi)=F(r)\exp(iL\phi)\exp(i\bar{\beta}z)[\hat{x}\cos(\gamma)-\hat{y}\sin(\gamma)].$$

Here, $\bar{\beta}=\pi(n_{eff,SO_a}+n_{eff,SO_{aa}})/\lambda$ is the average propagation constant between the two OAM modes; $\gamma$ is the optical activity angle of the electromagnetic radiation; z is the length of the optical fiber 108; and $\phi$ is the azimuthal angle $$\gamma = \frac{z\times\Delta\beta}{2} = \frac{\pi z\Delta n_{eff}}{\lambda},$$

$\Delta\beta$ is the difference in the propagation constant between the two OAM modes, and $\Delta n_{eff}$ is the difference in the effective index of the two OAM modes. Thus, it can be observed that the combination of the oppositely circularly-polarized OAM modes (e.g., left-handed and right-handed) of electromagnetic radiation propagating through optical fiber 108 is a linear polarization, and that this linearly-polarized electromagnetic radiation rotates as a function of the distance z of the optical fiber 108, the wavelength $\lambda$ of the electromagnetic radiation, and the effective index separation $\Delta n_{eff}$ between the two OAM modes.

Referring back to FIG. 1, the linearly-polarized electromagnetic radiation emitted at the output of the optical fiber 108 (which is a superposition of the two circularly-polarized OAM modes) has a polarization angle $\theta_2$. The difference between the polarization angles $\theta_1$ and $\theta_2$ is equal to the optical activity angle $\gamma$, which in turn is dependent on the wavelength $\lambda$ of the electromagnetic radiation. The linearly-polarized electromagnetic radiation at the output of the optical fiber 108 can be focused and/or collimated by lens 109A onto a beam splitter 109B. The beam splitter 109B can split the output beam of electromagnetic radiation into two different portions. One portion can propagate to an imaging device, such as a camera 109C, which can be used for validation or testing purposes. The other portion can propagate to a polarizing element 110.

Camera 109C can also be used to capture an image of the output electromagnetic radiation's intensity profile, in order to determine the modal purity of the output electromagnetic radiation. Modal purity refers to the amount of unwanted non-degenerate mode coupling (to OAM modes of different topological charges L) or degenerate mode coupling (from an OAM mode of topological charge L to its corresponding −L OAM mode equivalent). Power from the input OAM modes can couple to these non-degenerate and degenerate modes, reducing the accuracy of system 100. Different types of analyses can be performed to determine the amount of modal purity in system 100. In one implementation, an interferometric analysis can be performed to detect interference effects between different modes, to test the modal purity.

In other implementations, a time-of-flight method can be used to test modal purity. In these implementations, system 100 includes an additional electromagnetic radiation source that shares an optical path with the electromagnetic radiation source 102. The additional electromagnetic radiation source could be, for example, a picosecond pulsed laser. The addition electromagnetic radiation source is configured to emit pulses that propagate through the mode converter 106 and the optical fiber 108. The pulses excite modes that travel at different speeds, similar to the electromagnetic radiation source 102. After the pulses are emitted from the optical fiber 108, these pulses propagate to a high speed detector coupled to an oscilloscope. The oscilloscope displays the different pulses received from the additional electromagnetic radiation source. Because the different modes that are being excited in the optical fiber 108 are viewable on the oscilloscope, any changes that need to be made to the system 100 can be made, in order to achieve modal purity between the two OAM modes. In some implementations, this time-of-flight method can also be used to measure the group index difference $\Delta n$ between the two OAM modes, because the group index $n_g$ of the two OAM modes determines the speed at which the electromagnetic radiation propagates. Generally, any number of suitable methods or techniques can be used to test the modal purity.

Polarizing element 110 is configured to receive the linearly-polarized electromagnetic radiation, and convert this electromagnetic radiation into two orthogonal linearly-polarized components. The first component has a polarization angle equal to $\theta_n$, while the second component has a polarization angle equal to $\theta_{n+90°}$. In some implementations, the first component has a polarization angle identical to the polarization angle of the electromagnetic radiation that entered the optical fiber 108, and thus $\theta_n = \theta_1$, and $\theta_{n+90°} = \theta_{1+90°}$. In some of these implementations, where the initial beam of electromagnetic radiation is linearly-polarized along the x-axis, the first component of electromagnetic radiation from the polarizing element 110 is the $\hat{x}$ component of the electromagnetic radiation output from the optical fiber 108, while the second component of electromagnetic radiation from the polarizing element 110 is the $\hat{y}$ component of the electromagnetic radiation output from the optical fiber 108. Generally, so long as the polarizing element 110 outputs two orthogonal components of electromagnetic radiation, the polarization angle $\theta_2$ of the electromagnetic radiation that exits the optical fiber 108 can be measured with simplicity. In some implementations however, the electromagnetic radiation output from the optical fiber 108 can be split into components that are not orthogonal. The polarizing element 110 can be any suitable optical component, such as a polarization beam splitter, a rotatable linear polarizer, a polarimeter, etc.

The first component of the electromagnetic radiation is directed to a power meter 114A, while the second component of the electromagnetic radiation is directed to a power meter 114B. Power meter 114A measures the power $P_{\theta_n}$ of the first component, while power meter 114B measures the power $P_{\theta_n+90°}$ of the second component. In some implementations, the power meters 114A, 114B are germanium-based photodetectors. The ratio of the two powers is equal to the square of the tangent of the second polarization angle $\theta_2$, and thus $$\theta_2 = \tan^{-1}\left(\sqrt{\frac{P_{\theta_n+90°}}{P_{\theta_n}}}\right).$$

The optical activity angle $\gamma$ is the difference between $\theta_1$ and $\theta_2$, can thus be read out instantaneously, with minimal or no post-processing.

Once the optical activity angle $\gamma$ is determined, a wavelength measurement can be performed. As shown above, there the optical activity angle $\gamma$ is explicitly related to the wavelength $\lambda$ by $$\gamma = \frac{\pi z \Delta n_{eff}}{\lambda}.$$

However, $\Delta n_{eff}$ is also wavelength-dependent, which must be accounted for. A first-order Taylor expansion of the above equation reveals how the optical activity angle $\gamma$ changes in response to a change in wavelength of the electromagnetic radiation source 102, yielding the linear spectroscopic mapping:

$$\Delta\gamma = -\left\{\frac{\pi z \Delta n_g}{\lambda^2}\right\}\Delta\lambda = \alpha\lambda.$$

Here, $\Delta\gamma$ is the change in optical activity angle, $\Delta n_g$ is the group index difference between the two OAM modes, $\Delta\lambda$ is a change in wavelength (which could be a change between a first center wavelength and a second center wavelength), and $\alpha$ is a calibration factor defining the strength of the rotation imparted by the optical fiber 108. In some implementations, $\alpha$ can be generally be deduced experimentally. Additionally or alternatively, accurate theoretical modeling of the OAM modes of the optical fiber 108 would yield $\Delta n_g$, and thus $\Delta\gamma$ also.

Figure 5:
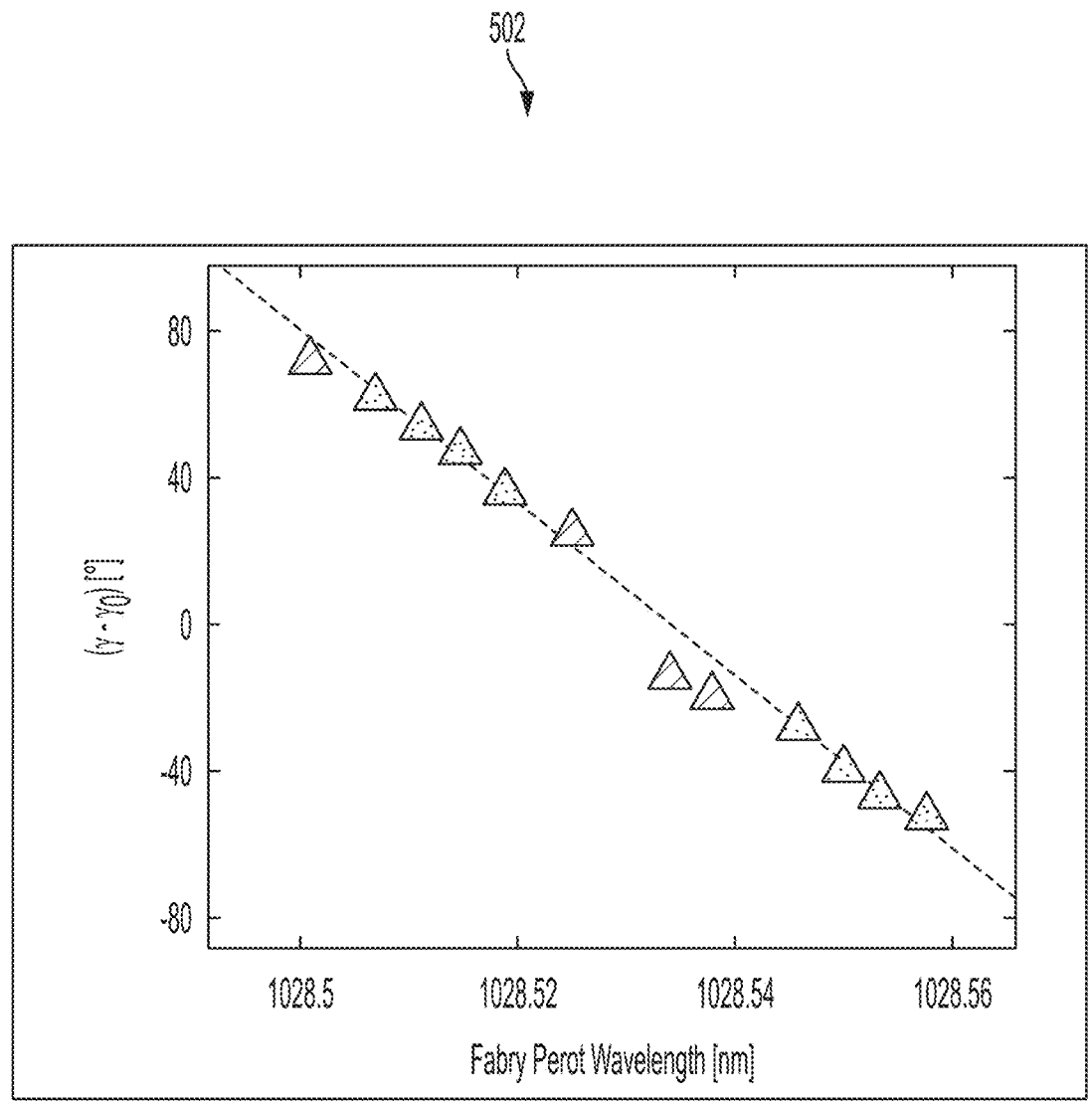
FIG. 5 is a plot of the relationship between a change in optical activity angle and a change in wavelength, according to aspects of the present disclosure.

FIG. 5 shows a plot 502 of the relationship between $\Delta\lambda$ and $\Delta\gamma$, obtained using an experimental characterization of the system 100 (or any of the other systems disclosed herein). The calibration factor $\alpha$ can be determined from plot 502. First, a beam of reference electromagnetic radiation having a reference wavelength $\lambda_0$ is input to system 100. System 100 then determines a reference optical activity angle $\gamma_0$, which measures how much the reference electromagnetic radiation rotated within the optical fiber. The reference wavelength $\lambda_0$ can be determined by an external component, such as the optical spectrum analyzer 103C, a gas absorption-based reference, cell, or any other suitable component. Second, a plurality of beams of electromagnetic radiation, each having a wavelength $\lambda$, are input into system 100. For each beam of electromagnetic radiation, the corresponding optical activity angle $\gamma$ is determined by system 100, and the wavelength $\lambda$ is determined by the reference component. Then, for each of the plurality of beams of electromagnetic radiation, the difference in optical activity angles $\Delta\gamma=\gamma-\gamma_0$ is plotted against the change in wavelength $\Delta\lambda=\lambda-\lambda_0$. A fit is performed on the data, so that $\gamma-\gamma_0=-\alpha(\lambda-\lambda_0)$, and the calibration factor ca is obtained. Thus, any change in wavelength $\Delta\lambda$ linearly maps to a change in optical activity angle $\Delta\gamma$.

Once the calibration factor $\alpha$ is obtained, system 100 can subsequently be used to measure wavelength change or wavelength drift $\Delta\lambda$. The smallest detectable wavelength change/drift is the resolution of the system 100. System 100 can be used for a variety of different applications. For example, system 100 could be used in coherent laser beam combining applications, to identify and measure wavelength drift in any of the laser beams. In another example, system 100 could be used with optical clocks, to identify and measure drift in an electromagnetic radiation source relative to a reference atomic resonance wavelength. In yet another implementation, system 100 can be used to measure over time how the wavelength of electromagnetic radiation emitted by the biological sample changes. Generally, system 100 is stable, and the calibration factor $\alpha$ remains substantially constant over time and is robust to perturbations (such as mechanical or thermal changes). However, system 100 can be periodically re-characterized to determine an updated value of the calibration factor $\alpha$ as needed. Indeed, system 100 can be used in any application where spectrometers, wavemeters, and/or spectrum analyzers are currently used, in order to provide higher resolutions and/or higher acquisition speeds.

Figure 6B:
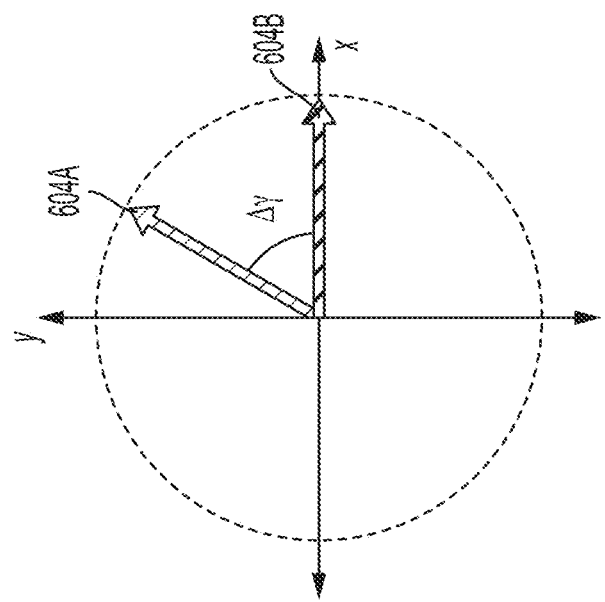
FIG. 6B is an image of an optical activity angle difference corresponding to the wavelength difference of FIG. 6A, according to aspects of the present disclosure.
Figure 6A:
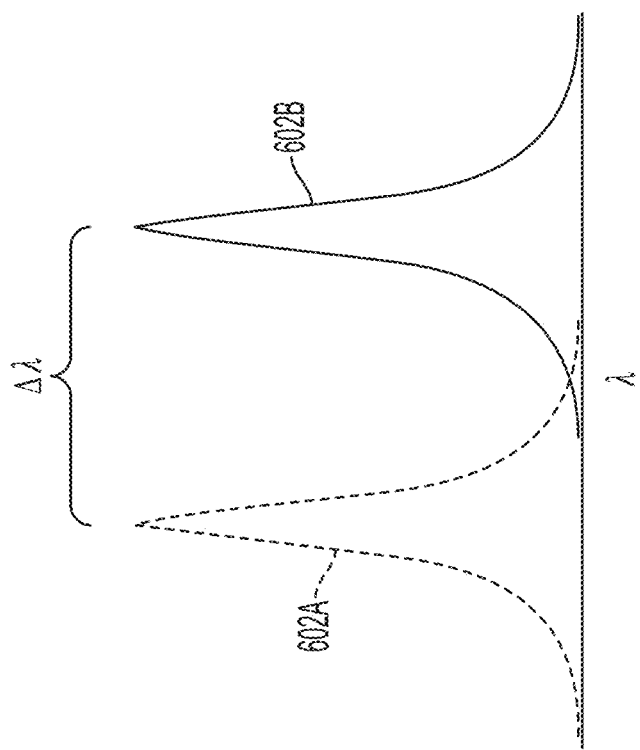
FIG. 6A is an image of a wavelength difference, according to aspects of the present disclosure.

FIGS. 6A and 6B illustrate the linear mapping between a change in wavelength $\lambda\lambda$ and a change in optical activity angle $\Delta\gamma$. As shown in FIG. 6A, two beams of electromagnetic radiation 602A and 602B can have some wavelength difference $\Delta\lambda$. As shown in FIG. 6B, beam of electromagnetic radiation 602A results in an optical activity angle 604A, while beam of electromagnetic radiation 602B results in an optical activity angle 604B. Thus, the change in wavelength $\Delta\lambda$ introduces a change in the optical activity angle $\Delta\gamma$ that is measured by system 100 for the beams of electromagnetic radiation 602A, 602B. Thus, because of the wavelength dependence on the group index difference $\Delta n_g$ between the two OAM modes, wavelength differences $\Delta\lambda$ can be measured.

Other properties can also be measured using system 100. For example, system 100 can be used to measure the center wavelength in the range of wavelengths, and/or the spread of the wavelengths in the range wavelengths, e.g., the bandwidth of the electromagnetic radiation. Other properties of complex spectra can also be measured, such as spectral separation, spectral amplitude ratio, etc.

System 100 can be implemented using a variety of different parameters for the different components. Generally, the parameters can be changed, depending on a number of factors for a given application, including resolution requirements, space concerns, cost, etc. Because the $\Delta\lambda$ is proportional to both the length of the optical fiber z and the group index difference $\Delta n_g$, and because the group index difference $\Delta n_g$ increases with topological charge L, the resolution of the system 100 (e.g., minimum detectable $\Delta\lambda$) can be increased by increasing the length of the optical fiber z and/or the topological charge L, e.g., by increasing the calibration factor $\alpha$.

For example, the optical fiber 108 can range in length between the centimeter scale (e.g., a length of about 1 centimeter or greater) up to the kilometer range. In still other implementations, the length of the optical fiber 108 can be less than 1 centimeter. In another example, the magnitude of the topological charge L of the OAM modes can generally be any integer between 1 and about 200 in many implementations. However, topological charges greater than 200 are also contemplated. The type of fiber used for the optical fiber 108 can also be modified as needed. For example, one implementation of system 100 includes a ring-core optical fiber 108 formed from a germanium-doped silicon dioxide ring and silicon dioxide cladding, as discussed above. However, the optical fiber 108 can have any suitable design or be made from any suitable material, so long as the optical fiber 108 supports propagation of a spin-orbit aligned OAM mode and a spin-orbit anti-aligned OAM mode have a minimum refractive index different $\Delta n_{eff}$ of greater than or equal to about $5\times 10^{-5}$.

As discussed herein, system 100 has a resolution that is the minimum wavelength difference detectable by measuring changes in optical activity. The resolution is generally dependent on the length of the optical fiber 108, the wavelength ranges which the system 100 is configured to operate at, and other factors. In one implementation, system 100 operates at a wavelength of about 1000 nanometers and has an optical fiber length of greater than or equal to 1 centimeter, and achieves a resolution of about 1.2 nanometers. In still another implementation, the system 100 operates at a wavelength of about 1000 nanometers and has an optical fiber length of greater than or equal to 6.0 centimeters, and achieves a resolution of about 0.2 nanometers. In yet another implementation, the system 100 has a resolution of about 0.3 picometers, with a resolving power (general wavelength at which the system 100 is operating divided by the resolution) of $R \geq 3.4 \times 10^6$. In still other implementations, the system 100 operates around another center wavelength, e.g., less than 1000 nanometers or greater than 1000 nanometers. Typical wavelength ranges in which the system 100 may operate covers the transparency range of optical fibers, which extends from the blue wavelengths of 400 nanometers through the mid-infrared wavelengths of 10,000 nanometers. The system 100 is capable of operating in all these wavelength ranges provided that the material with which the optical fiber is primarily constructed is sufficiently transparent to electromagnetic radiation at these wavelengths.

System 100 includes a number of components positioned between the polarizing element 110 and the power meters 114A, 114B. For example, both the orthogonal components of the electromagnetic radiation output from the optical fiber 108 can be directed to an additional mode converter 112. In some implementations, it can be difficult to only measure the two OAM modes from the optical fiber 108, because the input electromagnetic radiation can include additional OAM modes with different topological charges. In particular, if the desired OAM modes inadvertently couple to OAM modes that are degenerate in relation to the desired OAM modes (e.g., OAM modes having the opposite topological charge −L). the corresponding rotation of the degenerate OAM modes would be opposite direction to that of the desired OAM modes, but with the same magnitude of rotation. Thus, the presence of the unwanted OAM modes can lead to errors when calculating the optical activity angle $\gamma$.

The additional mode converter 112 is used to convert the two orthogonal components of the output linearly-polarized electromagnetic radiation (which is a superposition of the two OAM modes) into a topological charge $L_f=0$ state (e.g., no OAM mode), while any degenerate modes are converted to a topological charge $L_{degenerate}=2L_i$ state. A first iris 113A can be placed between the mode converter 112 and the first power meter 114A, while a second iris 113B can be placed between the mode converter 112 and the second power meter 114B. Because the optical power in the $L_{degenerate}=2L_i$ state of the degenerate modes is a ring that diffracts faster than power in the Gaussian spot-like $L_f=0$ state of the electromagnetic radiation being measured, the first and second irises 113A, 113B prevent any of the degenerate modes from reaching the respective power meters 114A, 114B. Flip mirror 113C can be placed between iris 113A and power meter 114A, and is used to direct a portion of the first component of the output linearly-polarized electromagnetic radiation (the component having a polarization angle $\theta_n$) to camera 113E.

Similarly, flip mirror 113D can be placed between iris 113B and power meter 114B, and is used to direct a portion of the second component of the output linearly-polarized electromagnetic radiation to camera 113E. Camera 113E can then be used to check to ensure that the degenerate modes are not reaching the power meters 114A, 114B. In some implementations, mirror 111A can direct the second component of the output linearly-polarized electromagnetic radiation (the component having a polarization angle $\theta_{n+90°}$) to a half-wave plate 111B, which can shift the polarization angle 90°, so that the second component has the same polarization angle $\theta_n$ as the first component. Mirror 111C can then direct the second component to the additional mode converter 112. Despite now having the same polarization angle $\theta_1$, the two components are distinguished by system 100 because the two components are measured by the two different power meters 114A, 114B. Converting the second component to have the same polarization angle as the first component eliminates any possible measurement errors that could be introduced by the different polarization angles.

Figure 7:
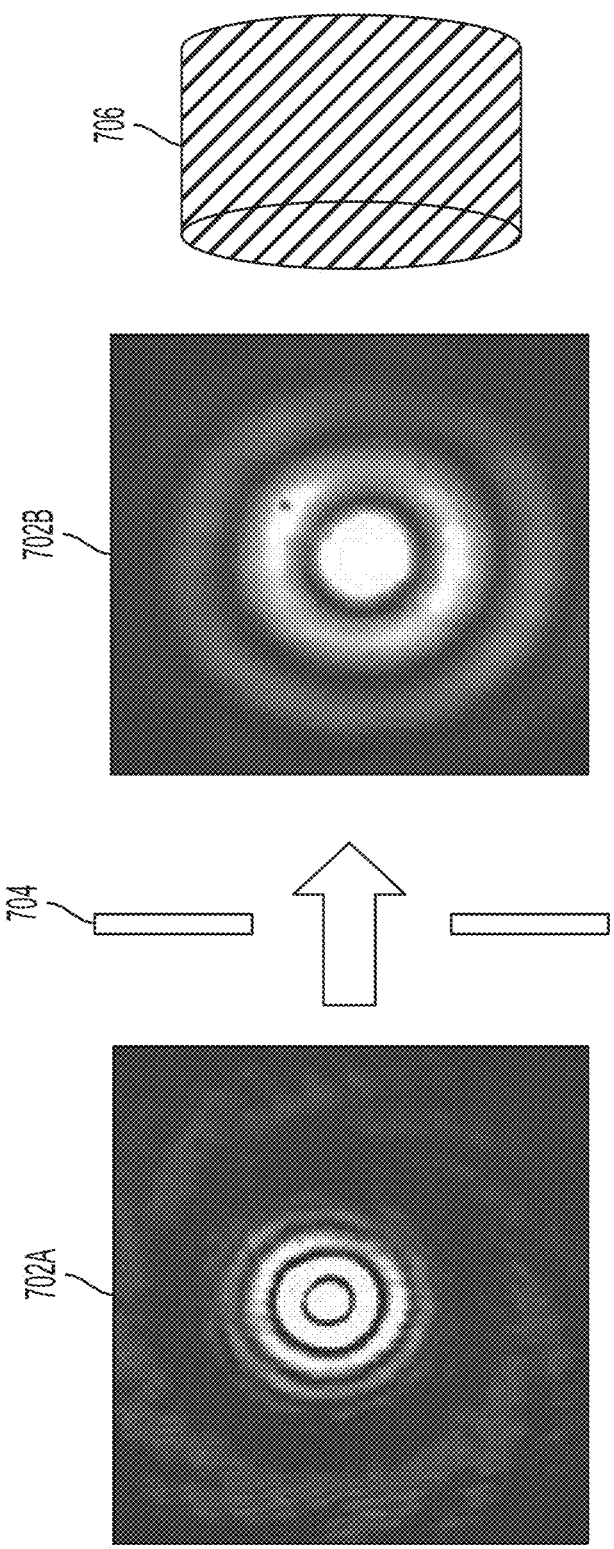
FIG. 7 is an image of an iris removing one or more degenerate modes from a beam of electromagnetic radiation, according to aspects of the present disclosure.

FIG. 7 shows images 702A and 702B that are representations of the output electromagnetic radiation with and without the degenerate modes. Image 702A shows the output electromagnetic radiation after having been modified by the additional mode converter 112. Image 702B shows the electromagnetic radiation after passing through an iris 704 (which could be either iris 113A or iris 113B). As shown, the halo from the $2L_i$ degenerate mode has been eliminated, and the remaining electromagnetic radiation propagates to detector 706 (which can be power meter 114A or power meter 114B).

Figure 8:
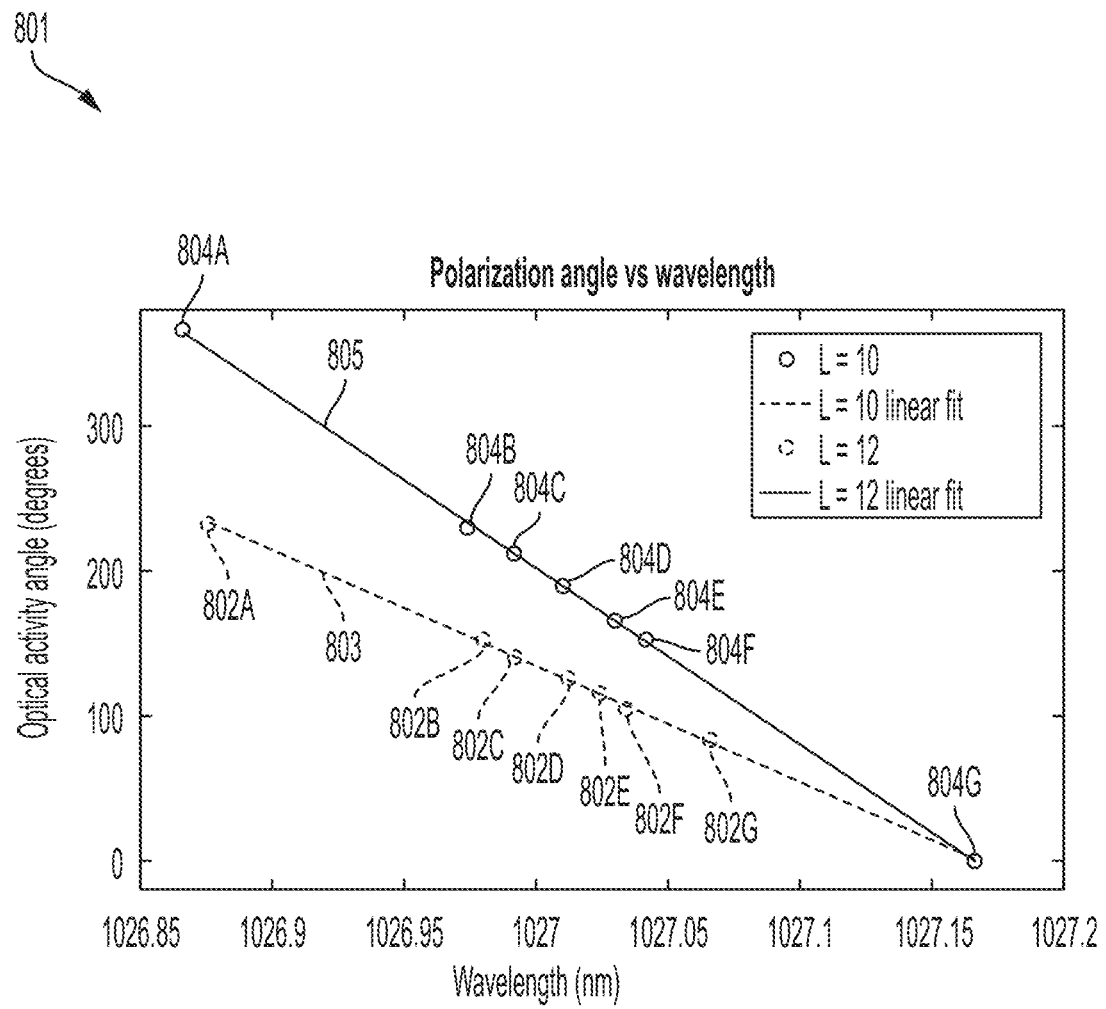
FIG. 8 is a plot of optical activity angle versus wavelength, according to aspects of the present disclosure.

FIG. 8 illustrates a plot 801 showing the optical activity angle γ as a function of the wavelength of the electromagnetic radiation. Data points 802A-802G plot the optical activity angle γ of electromagnetic radiation having a topological charge L=10, while data 804A-804G plot the optical activity angle γ of electromagnetic radiation having a topological charge L=12. Plot 801 also includes a linear fit 803 of the data points for the topological charge L=10 electromagnetic radiation, and a linear fit 805 of the data points for the topological charge L=12 electromagnetic radiation. As is shown, system 100 demonstrates that the optical activity angle γ changes with the wavelength of the electromagnetic radiation being measured, and the rate of this change increases with the topological charge L of the OAM modes used.

Figure 9B:
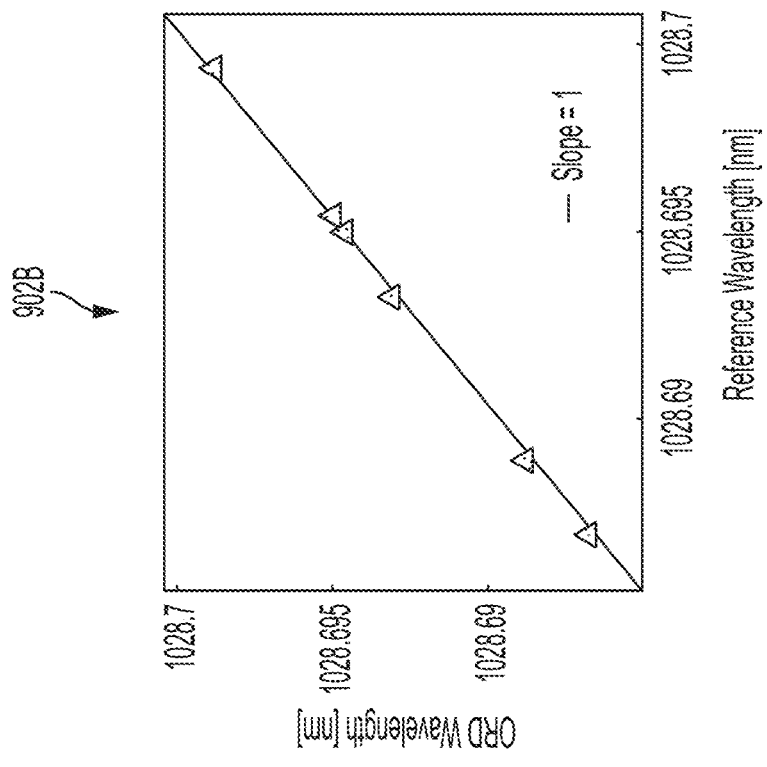
FIG. 9B is a second plot comparing measurements of the wavelength of electromagnetic radiation using the system of FIG. 1 and using a reference measurement device, according to aspects of the present disclosure.
Figure 9A:
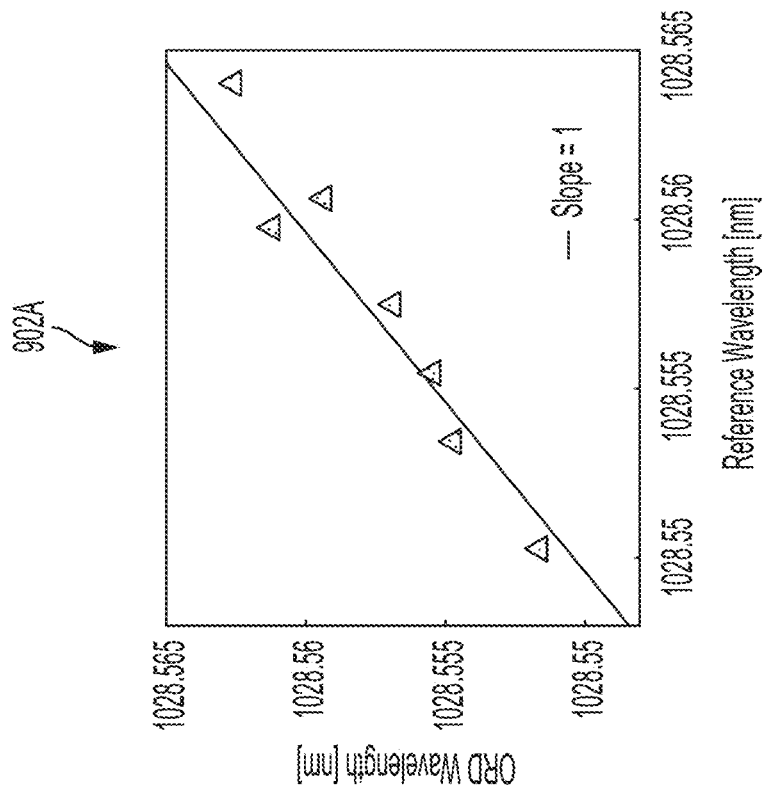
FIG. 9A is a first plot comparing measurements of the wavelength of electromagnetic radiation using the system of FIG. 1 and using a reference measurement device, according to aspects of the present disclosure.

FIGS. 9A and 9B show the results of a series of measurements conducted to evaluate the performance of system 100 (or any of the other systems disclosed herein). Plot 902A in FIG. 9A shows a comparison between the wavelength obtained using system 100 and the wavelength measured using a reference system (such as Fabry-Perot interferometer 103E) for electromagnetic radiation centered around 1028.55 nanometers. Plot 902B in FIG. 9B shows a comparison between the wavelength obtained using system 100 and the wavelength measured using a reference system (such as Fabry-Perot interferometer 103D) for electromagnetic radiation centered around 1028.7 nanometers. A residual error analysis around the slope=1 line reveals that system 100 is able to predict the wavelength of the electromagnetic radiation with an accuracy of approximately 1 picometer.

Figure 9C:
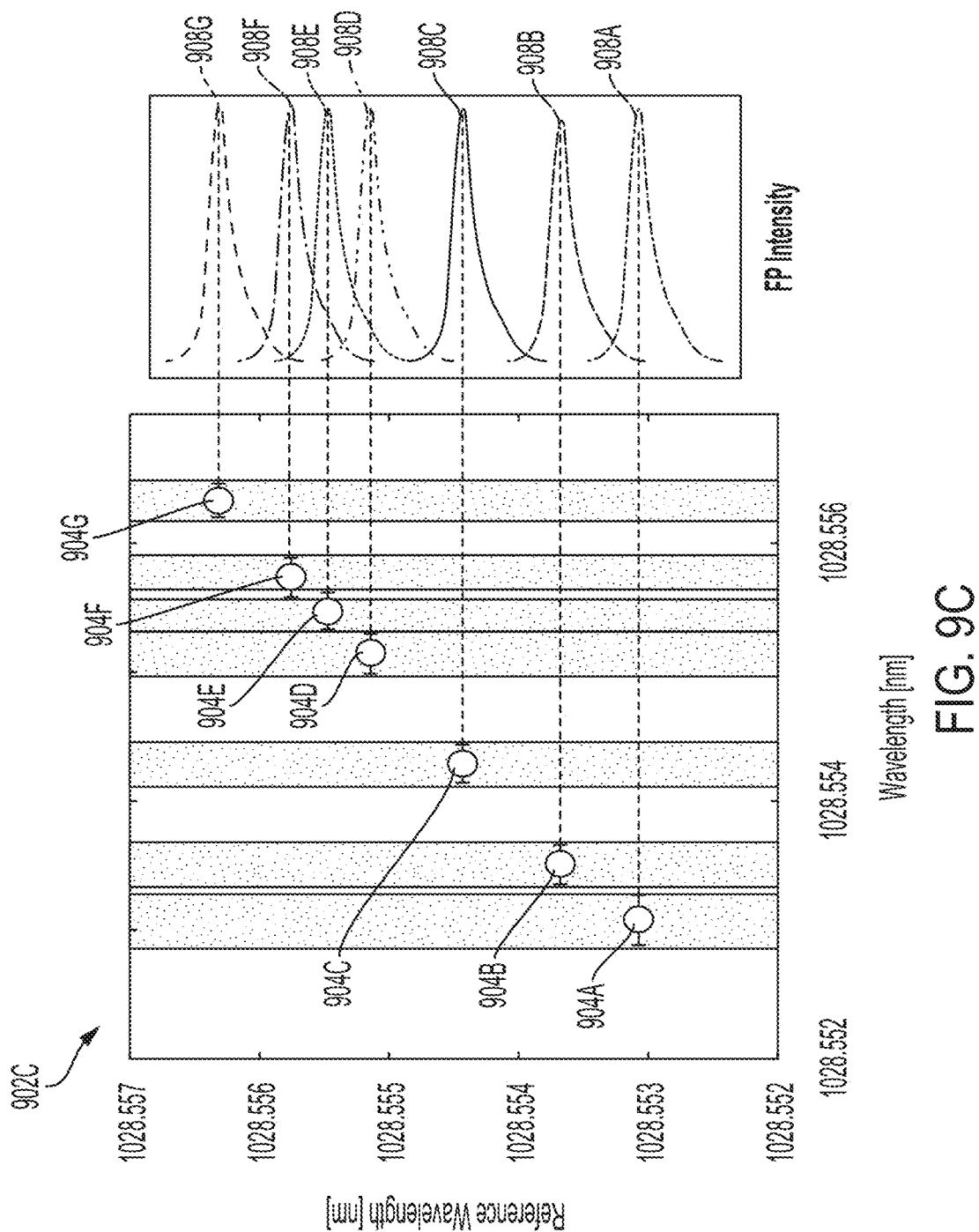
FIG. 9C is a third plot comparing measurements of the wavelength of electromagnetic radiation using the system of FIG. 1 and using a reference measurement device, according to aspects of the present disclosure.

FIG. 9C shows the results of a similar analysis as those of FIGS. 9A and 9B. For the analysis of FIG. 9C, the wavelength of the electromagnetic radiation source 102 was finely tuned using a thermoelectric cooler, and then the analysis of FIGS. 9A and 9B was performed. The results are shown in plot 902C, which plots the wavelength measured by the reference system (such as Fabry-Perot interferometer 103E) on the vertical axis, and the wavelength measured by system 100 on the horizontal axis. As is shown, the individual data points 904A-904G generally align with the inset intensity traces 906A-906G from the Fabry-Perot interferometer 103E. System 100 (or any of the other systems disclosed herein) can thus be capable of measuring wavelength differences of about 0.3 picometers for electromagnetic radiation generally centered around 1028 nanometers, which corresponds to a resolving power of about $R=3.4\times 10^6$.

Figures 10A, 10B:
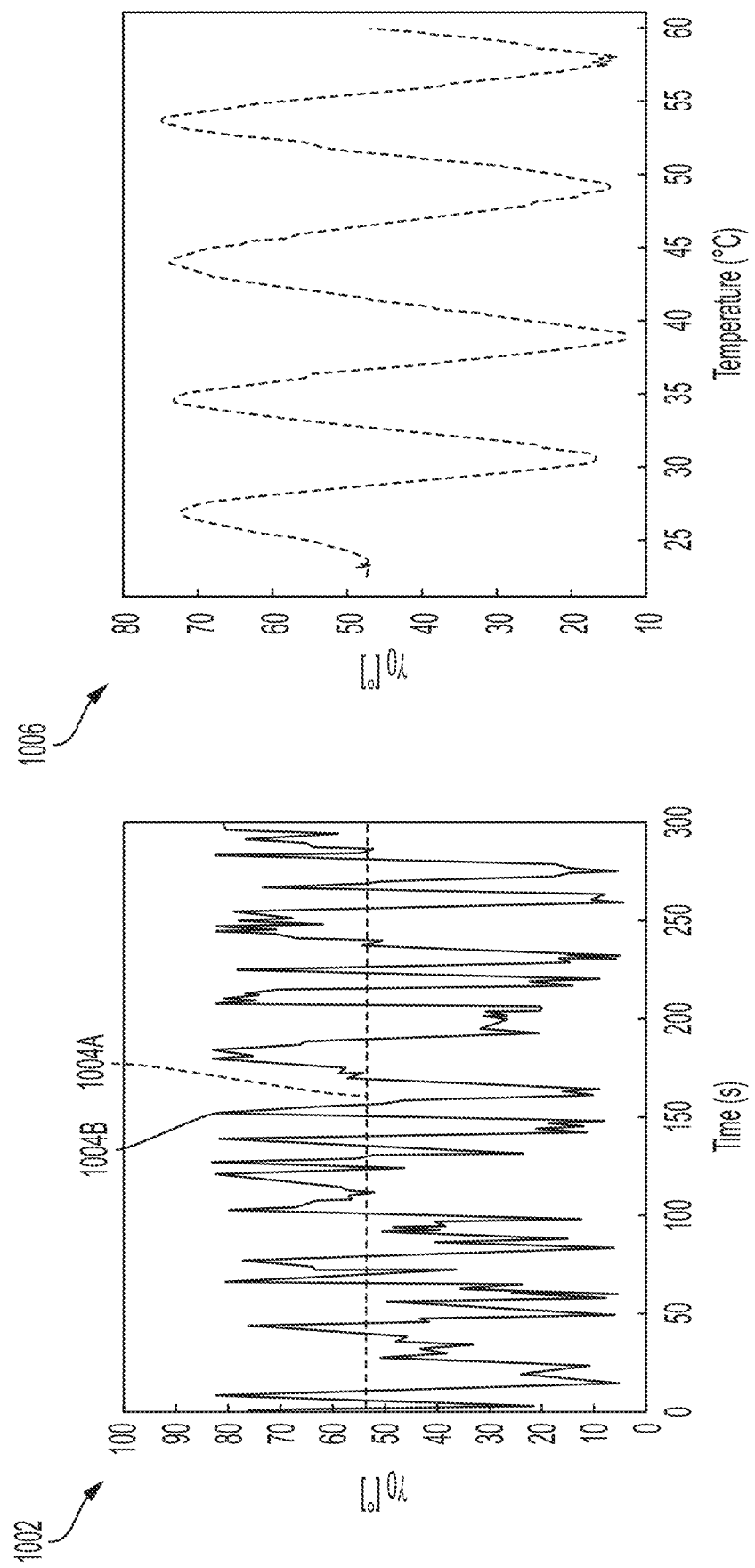
FIG. 10A is a plot of the measured optical activity angle versus time as an optical fiber of the system of FIG. 1 is mechanically perturbed, according to aspects of the present disclosure.
FIG. 10B is a plot of the measured optical activity angle versus time as the temperature of an optical fiber of the system of FIG. 1 is increased, according to aspects of the present disclosure.

FIG. 10A shows a plot 1002 that compares optical activity angle measurements obtained using system 100 (or any of the other systems disclosed herein) and polarization state measurements obtained using a conventional birefringent polarization-maintaining fiber spectrometer, as the optical fiber is mechanically perturbed over time. The measurement 1004A from system 100 (or any of the other systems disclosed herein) is generally constant over time, while the measurement 1004B from the conventional polarization-maintaining fiber spectrometer is sensitive to the mechanical perturbations, such that any spectroscopic mapping (such as between Δγ and Δλ) formed using the conventional polarization-maintaining fiber spectrometer is unstable, and thus incapable of serving as a stable wavelength measurement device. As such, system 100 is, in some implementations, robust enough to be insensitive to mechanically perturbed surroundings. In contrast, other systems are too sensitive to small mechanical perturbations, and thus are not suitable for applications involving a mechanically perturbed environment.

FIG. 10B shows a plot 1006 of optical activity angle measurements obtained using system 100 (or any of the other systems disclosed herein) as a function of the temperature of the system 100. The optical fiber 108 of system 100 was heated from 22° C. to 60° C. while the optical activity angle was being measured. The resulting thermal expansion of the optical fiber 108 (e.g., increases in the fiber length z) causes the optical activity angle measurements to vary in a strictly periodic fashion, as the earlier equation showed, thus demonstrating the resiliency of system 100 to thermal perturbations. Thus, as shown in FIGS. 10A and 10B, the superposition of the two OAM modes in the optical fiber 108 maintains both amplitude and phase differences under nearly all conditions, because of spin-orbit interaction stability in the optical fiber 108. This inherent stability allows for the length z of the optical fiber 108 to be increased up to the kilometer scale.

Figure 11:
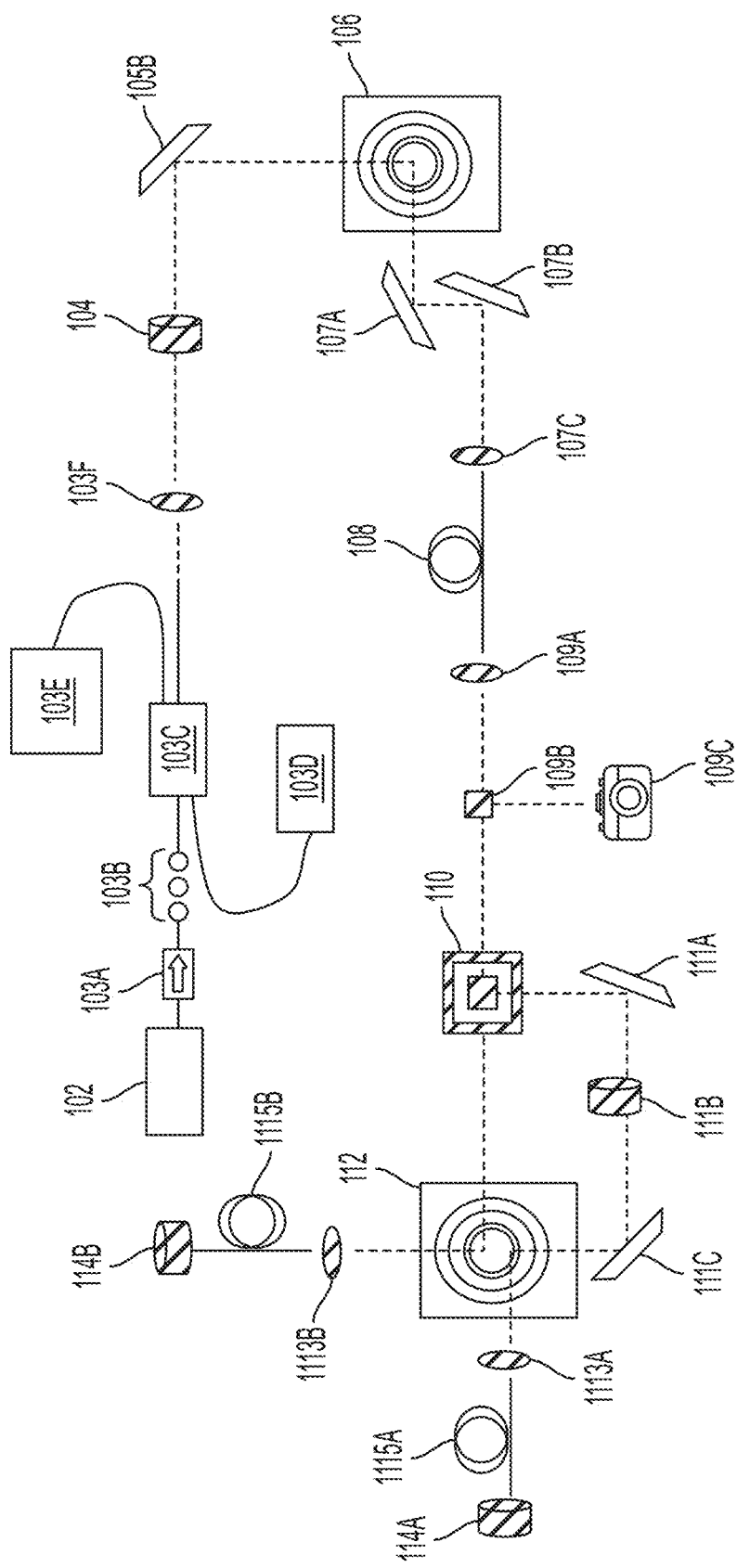
FIG. 11 is a second system for measuring a property of electromagnetic radiation, according to aspects of the present disclosure.

FIG. 11 shows a system 1100 that can be used to measure properties of electromagnetic radiation. System 1100 is similar to system 100, and includes components such as the electromagnetic radiation source 102, the polarizing element 104, the mode converter 106, the optical fiber 108, the polarizing element 110, the additional mode converter 112, and the power meters 114A, 114B. However, instead of having irises 113A and 113B to remove the degenerate modes coupled to the electromagnetic radiation output from the optical fiber 108, system 1100 includes two lenses 1113A, 1113B, and two single-mode fibers 1115A and 1115B. Single-mode fiber 1115A is positioned between mode converter 112 and power meter 114A, and single-mode fiber 1115B is positioned between mode converter 112 and power meter 114B. Lens 1113A directs one of the outputs of the additional mode converter 112 to single-mode fiber 1115A. Lens 1113B directs the other output of the additional mode converter 112 to single-mode fiber 1115B. The single-mode fibers 1115A, 1115B are designed to only support propagation of the $L_f=0$ modes that are output from the mode converter 112, e.g., the electromagnetic radiation that was formerly the two OAM modes propagating through the optical fiber 108. Thus, single-mode fiber 1115A ensures that only the $L_f=0$ mode of the first component of the output electromagnetic radiation reaches power meter 114A, while single-mode fiber 1115B ensures that only the $L_f=0$ mode of the second component of the output electromagnetic radiation reaches power meter 114B.

Figure 12:
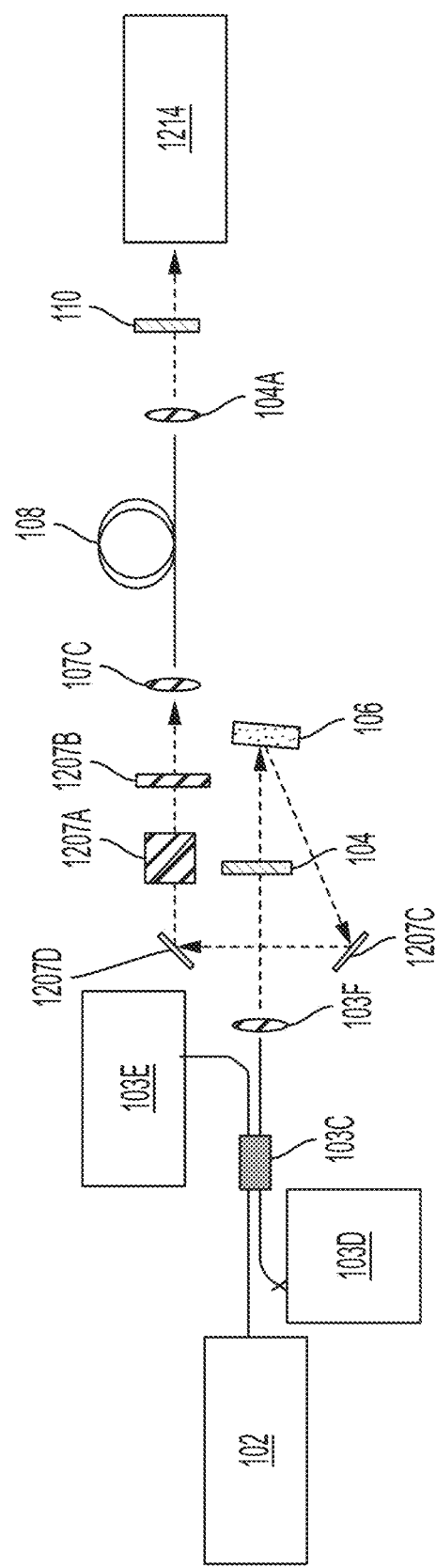
FIG. 12 is a third system for measuring a property of electromagnetic radiation, according to aspects of the present disclosure.

FIG. 12 shows a system 1200 that can be used to measure properties of electromagnetic radiation. System 1200 is similar to system 100 and system 1100, and includes the electromagnetic radiation source 102, the polarizing element 104, the mode converter 106, the optical fiber 108, and the polarizing element 110. However, system 1200 includes a polarizing beam splitter 1207A and a quarter wave plate 1207B positioned between the mode converter 106 and the optical fiber 108. The polarizing beam splitter 1207A and a quarter wave plate 1207B can be used to convert linearly-polarized electromagnetic radiation directly into left-handed circularly polarized electromagnetic radiation and right-handed circularly polarized electromagnetic radiation, before being input into the optical fiber 108. The quarter wave plate 1207B could also in some implementations be used to pass linearly-polarized electromagnetic radiation.

Further, the polarizing element 110 of system 1200 does not split the electromagnetic radiation output from the optical fiber 108 into two orthogonal components, and system 1200 does not include separate power meters 114A, 114B to measure the power of the orthogonal component. Instead, the polarizing element 110 is a linear polarizer that is configured to rotate. The polarizing element 110 rotates until the rotation angle of the linear polarizer matches the polarization angle $\theta_2$ of the electromagnetic radiation output from the optical fiber 108. When this match occurs, the power of the electromagnetic radiation passing through the polarizing element 110 as measured by a power meter 1214 is at a maximum. By determining the rotation angle of the polarizing element 110 when the power meter 1214 detects the maximum power passing through the polarizing element 110, the polarization angle $\theta_2$ of the electromagnetic radiation can be determined, from which the optical activity angle $\gamma$ can then be determined.

Figure 13:
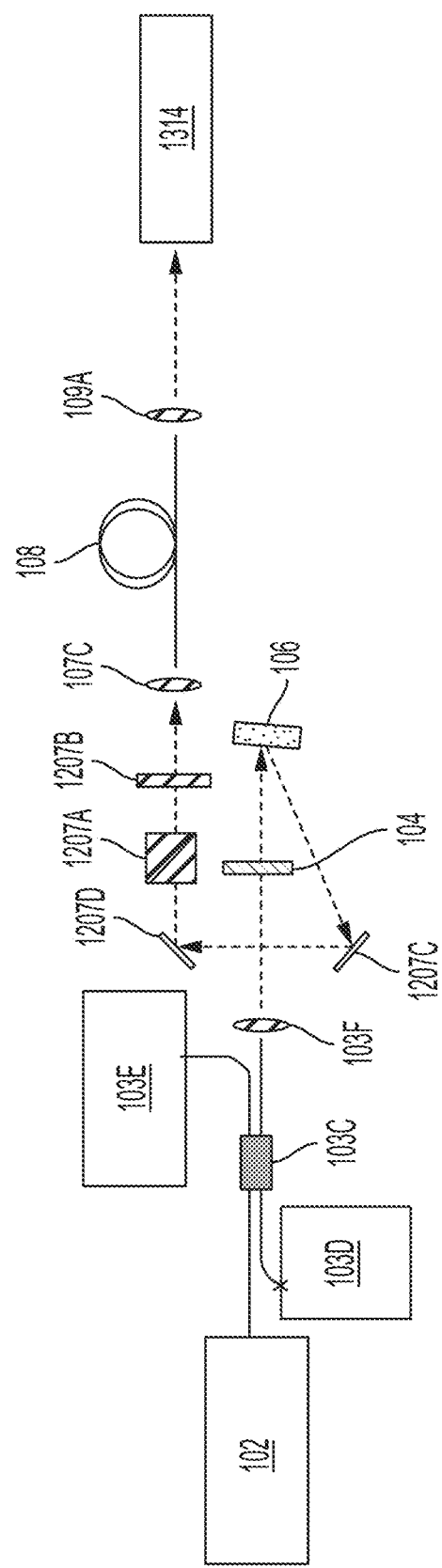
FIG. 13 is a fourth system for measuring a property of electromagnetic radiation, according to aspects of the present disclosure.

FIG. 13 shows a system 1300 that can be used to measure properties of electromagnetic radiation. System 1300 is similar to system 1200, except that system 1200 does not include a polarizing element that the electromagnetic radiation output from the optical fiber 108 is incident on. Instead, the rotated electromagnetic radiation that is output from the optical fiber 108 is directed to a polarimeter 1314. The polarimeter 1314 is configured to receive the electromagnetic radiation from the optical fiber 108 and measure the polarization angle $\theta_2$, from which the optical activity angle $\gamma$ can then be determined.

Referring to FIGS. 14A-14D, in some implementations, the systems disclosed herein (including system 100, 1100, 1200, and 1300) can benefit from multiplexing multiple OAM modes of differing topological charge L that are supported by the optical fiber 108. Here, a plurality of linearly polarized OAM modes can be introduced into the optical fiber 108, and each OAM mode is separately measured at the output. The free spectral range (FSR) of any system describes the range of wavelengths over which measurements by the disclosed systems are distinguishable, or unique. In the disclosed systems, the relation between the optical activity angle and the powers of the orthogonal components of the output electromagnetic radiation from the optical fiber 108 limits the FSR, because the range of measurable optical activity angles $\gamma$ is limited to a range of between about 0° and about 90°. This means that when optical activity measurements are performed using a single set of OAM modes with topological charge L, the wavelength range over which the systems provide unique wavelength mapping is limited.

Figure 14A:
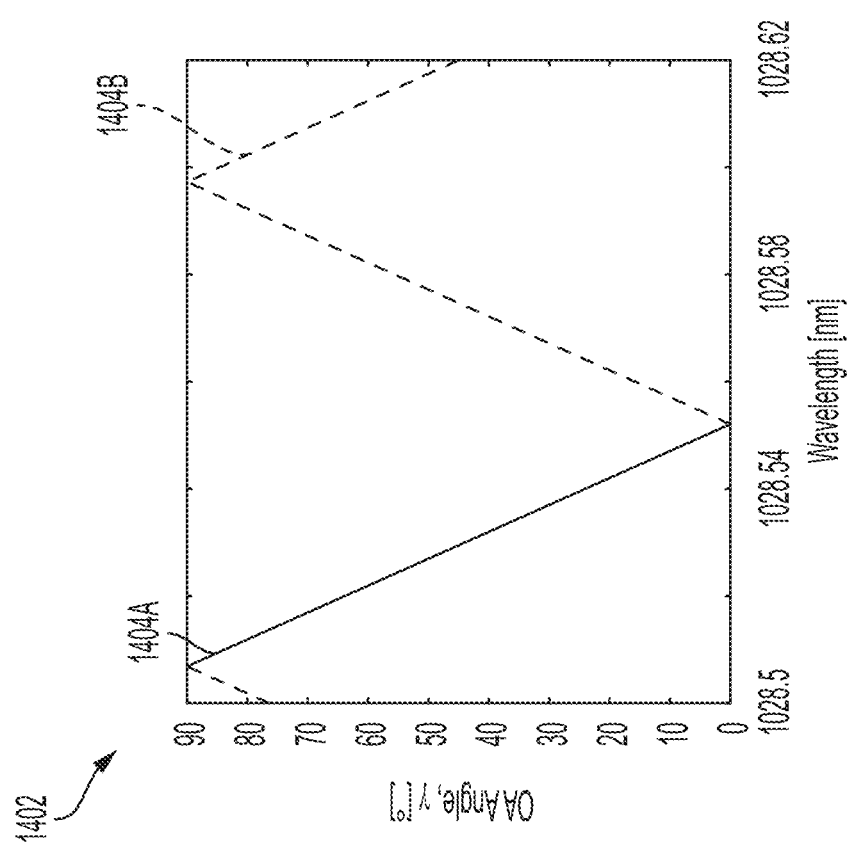
FIG. 14A is a plot of the mapping between optical activity angle and wavelength for one mode of electromagnetic radiation, according to aspects of the present disclosure.
Figure 14B:
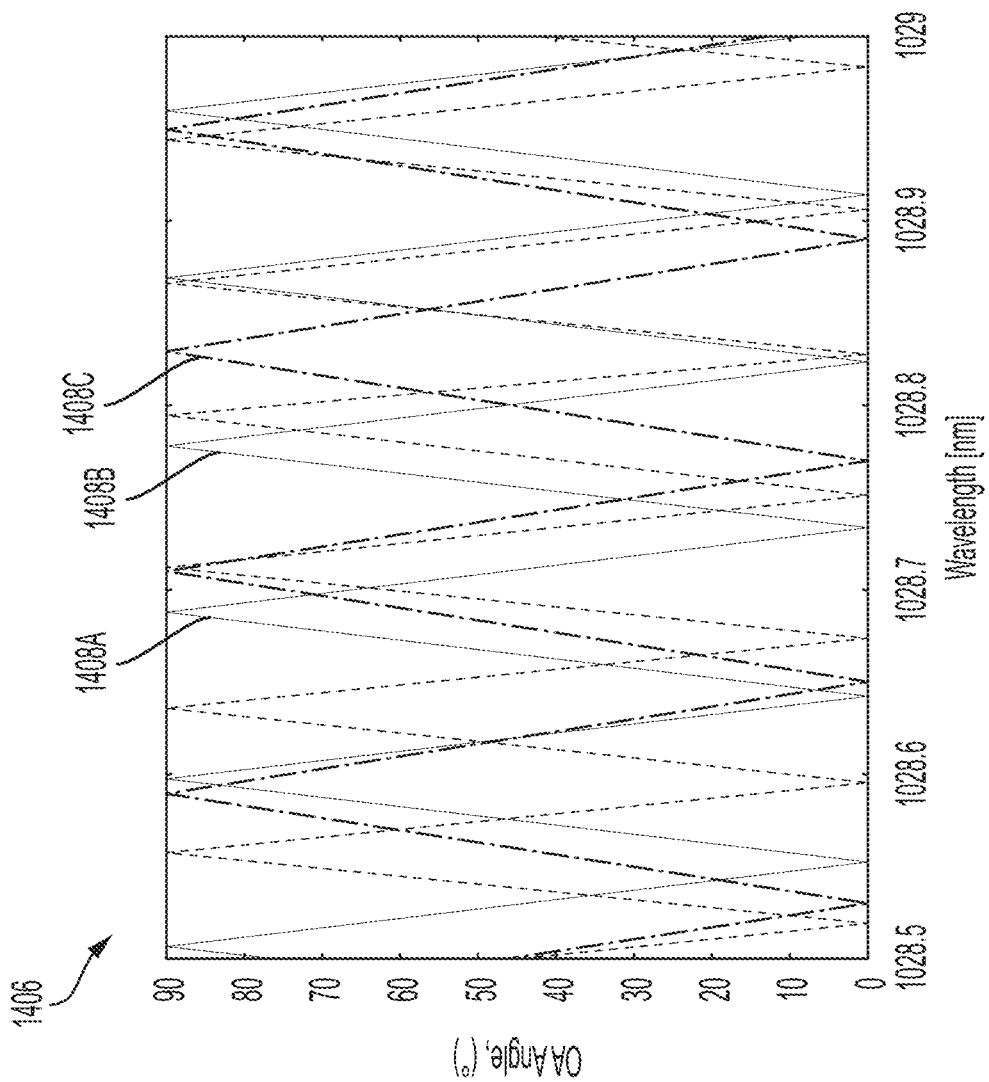
FIG. 14B is a plot of the mapping between optical activity angle and wavelength for three modes of electromagnetic radiation, according to aspects of the present disclosure.

FIG. 14A shows a plot 1402 of the optical activity angle versus wavelength for a single pair of OAM modes. As shown, the pair of OAM modes has unique measurements only in a range of between 0° and 90°. That is, there is only a small wavelength range within which there is a unique mapping between optical activity angle and wavelength, and thus the usable range of a unique change in optical angle $\Delta\gamma$ is limited. Moreover, if the detectors (such as power meters 114A, 114B) that measure each polarization component are noisy in nature (e.g., they measure a finite amount of power even in the absence of illumination with electromagnetic radiation), this range uniquely measurable optical activity angles is further reduced. Since the usable range of unique $\Delta\gamma$ is limited, the measurable range of $\Delta\lambda$ is also limited. This limited measurable range of $\Delta\lambda$ is the FSR of the system. The measurable range of $\Delta\lambda$ is shown in plot 1402 with a solid line, while the non-measurable range of wavelengths is shown in plot 1402 with a dashed line FIG. 14B shows a plot 1406 with three pairs of OAM modes (six modes total) excited in the optical fiber 108 at the same time. The measurements 1408A from the first pair of OAM modes are shown with a solid line. The measurements 1408B from the second pair of OAM modes are shown with a dashed line. The measurements 1408C from the first pair of OAM modes are shown with a bold line of repeating dashes and dots. With three different pairs of OAM modes, there are three different optical activity angle measurements for any given wavelength. The range over which there is a unique mapping between the three optical activity angle measurements and the wavelength is much greater, as compared to when only using one OAM mode. By utilizing additional pairs of OAM modes in some implementations, the free spectral range of the disclosed systems can be increased from about 46 picometers to about 365 nanometers. The new FSR of the systems is determined by the composite spectral repetition range of all the pairs of OAM modes used in taking measurements, allowing for a large degree of enhancement. This FSR enhancement will also critically depend on the parameters that determine each mode's optical activity response, such as fiber length, wavelength, $\Delta n_g$ (between each distinct pair of OAM modes), etc. This improvement occurs without any sacrifice in system resolution. In some implementations, the system resolution can even improve.

Figure 14C:
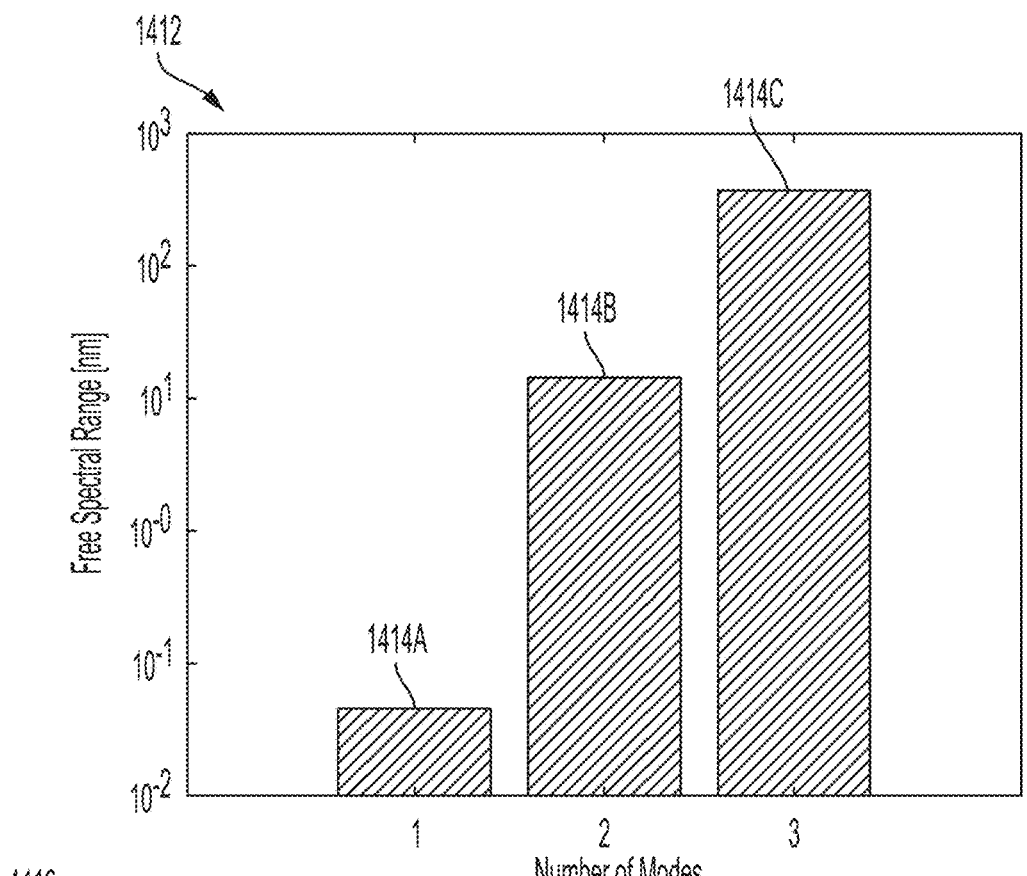
FIG. 14C is a plot of the free spectral range of the system of FIG. 1 versus the number of modes of electromagnetic radiation, according to aspects of the present disclosure.
Figure 14D:
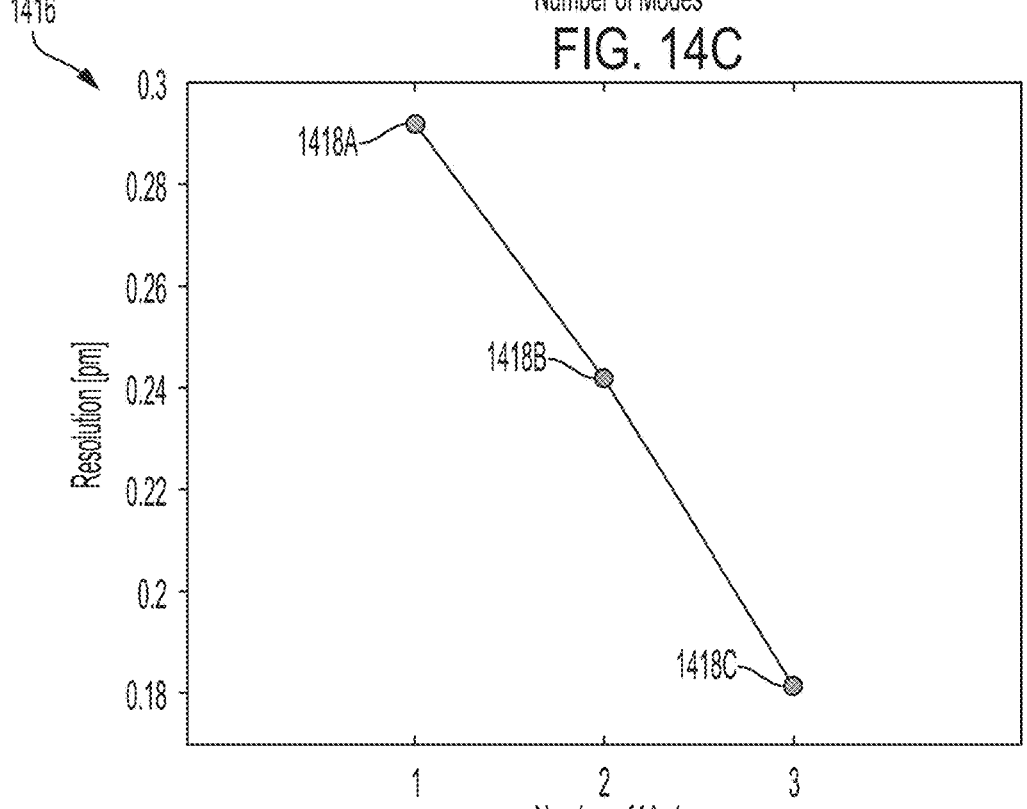
FIG. 14D is a plot of the resolution of the system of FIG. 1 versus the number of modes of electromagnetic radiation, according to aspects of the present disclosure.

FIG. 14C shows an example plot 1412 of the system FSR versus the number of modes. With only one mode, the system FSR 1414A is less than $10^{-1}$ nanometers. With two modes, the system FSR 1414B increases to around $10^1$ nanometers. And with three modes, the system FSR 1414C increases to above $10^2$ nanometers. FIG. 14D shows a plot 1416 of the system resolution, plotted against the number of modes. The value of the system resolution is the smallest measurable change in wavelength $\Delta\lambda$. With only one mode, the resolution 1418A is about 0.28 picometers. With two modes, the resolution 1418B of the system has increased, with a value of about 0.24 picometers. And with three modes, the resolution 1418C has further increased, with a value of about 0.18 picometers. Thus, plots 1412 and 1416 demonstrate that as the number of modes that are simultaneously excited in the fiber increase, the range of measurable changes in wavelength $\lambda$ increases, causing the system FSR to increase. Simultaneously, the system resolution also increases.

Figure 15:
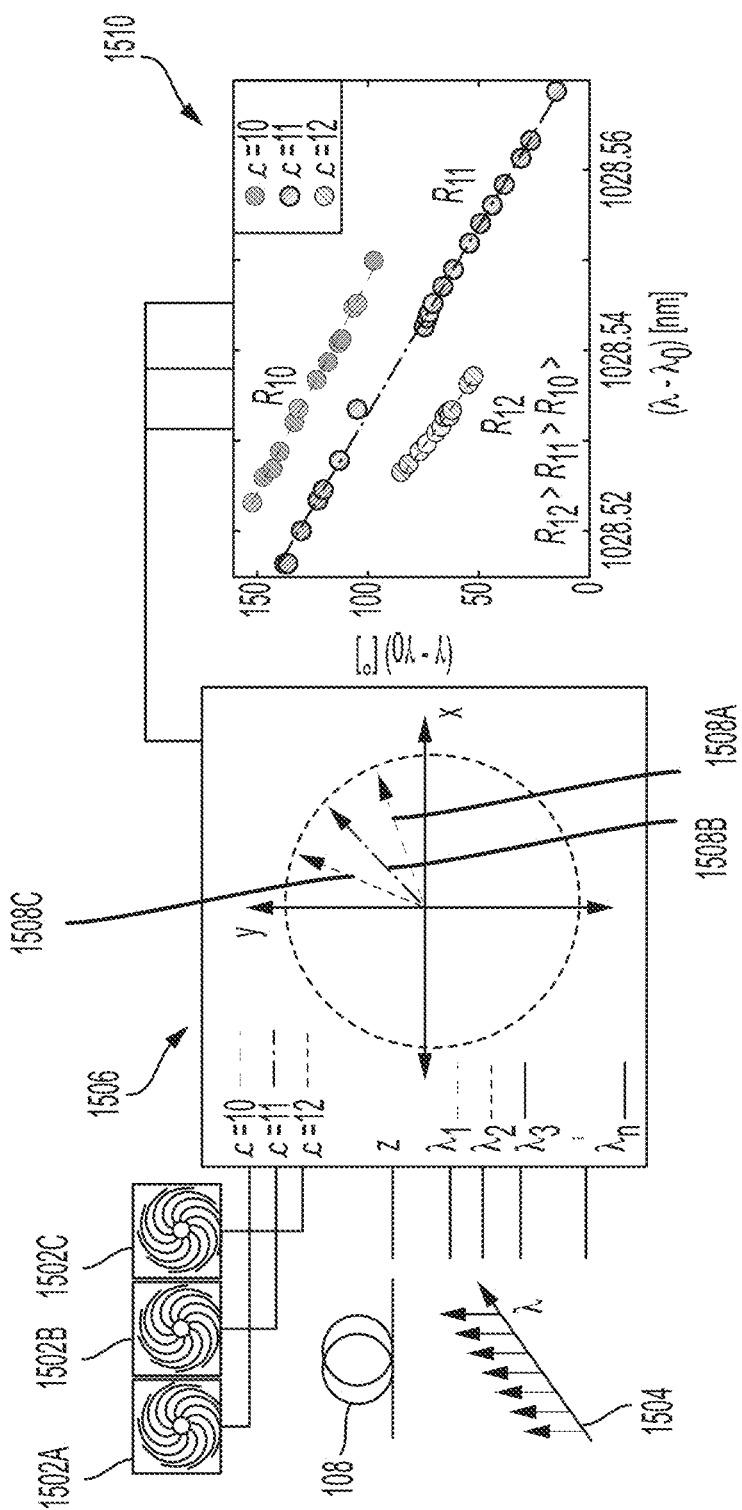
FIG. 15 is a representation of a multiplexed version of the system of FIG. 1, according to aspects of the present disclosure.

FIG. 15 shows a representation of a multiplexed version of any of the systems disclosed herein. As is shown, three different OAM modes 1502A, 1502B, 1502C are excited in an optical fiber 108, having length z. In the example, the three different OAM modes correspond to L=10, L=11, and L=12. However, any number of OAM modes having any topological charge value can be used. In FIG. 15, the graphical representations the OAM modes 1502A, 1502B, 1502C are intensity patterns in spiral shapes that result from interfering the OAM modes with a Gaussian beam. However, these spiral intensity patterns are shown for illustrative purposes only. The value of the wavelength 1504 of the OAM modes can range from $\lambda_1$ to $\lambda_n$.

Plot 1506 shows an illustrative example of the change in the output angle of each of the three different modes (on polarization axes where x polarization represents 0° and y polarization represents 90°). As shown, the output angle 1508A of the L=10 OAM mode (light dashed line) is less than the output angle 1508B of the L=11 OAM mode (dotted and dashed line), which is less than the output angle 1508C of the L=12 OAM mode (heavy dashed line). Plot 1510 shows the results of the wavelength measurements using the multiplexed system. As is shown, each OAM mode results in a distinct set of measurements 1512A (L=10), 1512B (L=11), 1512C (L=12). Thus, distinct calibration factors $\alpha$ and resolving powers $R_{10}$, $R_{11}$, and $R_{12}$ can be identified. Thus, by multiplexing, the system FSR can be increased, and high system resolutions can be maintained, as described above. In these multiplexing implementations, the systems can include a mode sorter to separate the modes (e.g., sorting via the mode's topological charge), and additional power detectors to measure the power of the additional modes and/or the orthogonal components of the additional modes. For example, if three pairs of OAM modes are used, a first set of power detectors can be used to measure the first pair of OAM modes or the components thereof, a second set of power detectors can be used to measure the second pair of OAM modes or the components thereof, and a third set of power detectors can be used to measure the third pair of OAM modes or the components thereof.

Thus, the disclosed systems can support the propagation of multiple different pairs of circularly-polarized OAM modes all having different topological charges. These different OAM modes can all initially have a polarization angle $\theta_1$ when entering the optical fiber 108. Due to the different topological charges, the different OAM modes generally all rotate a different amount in the optical fiber, and thus are emitted from the optical fiber at different polarization angles $\theta_2$, $\theta_3$, $\theta_4$, etc. These polarization angles can be used to measure various properties of the electromagnetic radiation, as discussed herein. In some implementations, OAM modes with different topological charges could rotate the same amount in the optical fiber, and thus have the same polarization angle when emitted from the optical fiber.

Referring now to FIGS. 16A-16C, in some implementations, the systems disclosed herein (including system 100, 1100, 1200, and 1300) can be used to measure the spectral bandwidth of the electromagnetic radiation source. FIG. 16A shows a broadband spectrum 1602 of electromagnetic radiation and a narrow spectrum 1604 of electromagnetic radiation. The broadband spectrum 1602 contains more wavelength components than the narrow spectrum 1604. As the electromagnetic radiation with the broadband spectrum 1602 propagates in the optical fiber 108, the multiple wavelength components all experience various degrees of rotation. The superposition of all these optical activity rotations results in elliptical polarization at the output of the optical fiber 108. This ellipticity is deduced by measuring the visibility of the electromagnetic radiation at the output of the fiber, as shown in plot 1606 of FIG. 16B. The visibility of the system is $V=(P_{max}-P_{min})/(P_{max}+P_{min})$. Here, $P_{max}$ and $P_{min}$ refer to the maximum and minimum power measured in the two polarization arms of the output of the fiber. To perform this measurement, power meter 114A is used to measure $P_{max}$, while power meter 114B is used to measure $P_{min}$. In some implementations, this is achieved by appropriately biasing polarizing element 110 at a desired angle. In other implementations, the system sweeps through the wavelengths of the spectrum until the condition ($P_{max}$ on power meter 114A and $P_{min}$ on power meter 114B) is met. If the functional form of the spectrum is known (e.g., Lorentzian, Gaussian, Voigt, etc.), then visibility measurements can be uniquely mapped to different bandwidths, allowing for direct measurement of the spread of wavelengths emitting from the electromagnetic radiation source.

FIG. 16C shows a plot 1608 of the experimental visibility of one of the disclosed systems, versus the bandwidth of the electromagnetic radiation being measured. In an example, the spectral bandwidth of the electromagnetic radiation source is controlled using an electro-optic phase modulator and arbitrary waveform generator. As plot 1608 in FIG. 16C shows, as the bandwidth of the source is progressively increased, the visibility of the output decreases monotonically. This provides for a one to one mapping between visibility and the bandwidth of the electromagnetic radiation source, which is the parameter that can be measured.

With only one optically activity pair of OAM modes, implementation of the spectral bandwidth measurement technique requires biasing either polarizing angle or wavelength. However, by using the multiplexing principles described herein with respect to at least FIGS. 14A-14D and 15, the measurement of complex spectra generally does not require any biasing or a priori tuning of the angles of the polarizing element 110, or of the wavelength of the electromagnetic radiation source.

Referring to FIGS. 17A-17C, with multiple simultaneous measurements using multiple OAM modes, more complex spectra features could also be resolved. For example, changes in the spectral amplitude and the spectral separation can be measured. FIG. 17A shows a Gaussian double hump spectrum. The upper plot 1701A shows an example change in the spectral amplitude, while the lower plot 1701B shows an example change in the spectral separation. In the spectral amplitude plot 1701A, the initial spectrum contains peaks 1702A and 1702B, which is lower than peak 1702B. The Gaussian double hump spectrum can be modified so that peak 1702B transforms into peak 1703B. Plot 1708 in FIG. 17B shows a plot of the system visibility versus the spectral amplitude ratio. As can be seen, as the spectral amplitude ratio changes (for example as shown in plot 1701A), the system visibility can be measured for each of three different OAM modes, which allows for a larger unique mapping of visibility to spectral amplitude ratio.

Similarly, in the spectral separation plot 1701B, the initial spectrum contains peaks 1704A, 1704B. The spectral separation of the Gaussian double hump spectrum can be changed, so that the spectrum consists of peaks 1706A, 170B, which have a smaller spectral separation. Plot 1710 in FIG. 17C shows a plot of the measured optical activity angle versus the spectral separation. As can be seen, as the spectral separation changes (for example as shown in plot 1701B), the optical activity angle can be measured for each of three different OAM modes, which allows for a larger unique mapping of visibility to spectral separation. Generally, by multiplexing multiple OAM modes, any number of different features of complex spectra can more accurately be measured. Therefore, with enough modes available for multiplexing, the disclosed systems can be used to measure spectral bandwidth, as well as additional and more complex spectral parameters (such as spectral amplitude, spectral separations, etc.), all while remaining in a single-shot configuration.

While systems 100, 1100, 1200, and 1300 are shown with a variety of different components, certain implementations require fewer components than what is illustrated. For example, in some implementations, these systems include only the electromagnetic radiation source 102, the polarizing element 104, the mode converter 106, the optical fiber 108, and the components necessary to determine the final polarization angle. In systems 100 and 1100, those additional components include at least the polarizing element 110, the mode converter 112, and the power meters 114A, 114B. In system 1200, those additional components include at least the polarizing element 110 that is a rotating linear polarizer, and the power meter 1214. In system 1300, those additional components include at least the polarimeter 1314. Thus, the disclosed systems can include any number of different measurement devices that aid in determining the angle of the electromagnetic radiation after it is emitted from the optical fiber 108, and/or any further properties, such as optical activity, wavelength, spectral bandwidth, spectral amplitude, etc. These measurement devices can include any required power meters, polarizing components, polarimeters, and/or processing devices to analyze the data. Moreover, the use of any mirrors, lenses, and other optical components used to direct the electromagnetic radiation can be dependent on the specific set up of the system and spatial concerns. For example, mirrors can be used to make the systems more compact if needed.

Additionally, the disclosed systems can include any number of processing devices to control any one or more of the components of the systems, and/or to perform any of the analysis or calculations discussed herein. For example, the systems may include a processing device (such as a desktop computer, a laptop computer, etc.) coupled to the power meters 114A, 114B, power meter 1214, or polarimeter 1314. The processing device can be configured to receive data indicative of the measurements performed by those devices, and process that data to generate the polarization angle of the electromagnetic radiation emitted by the optical fiber 108. The processing device can then perform any necessary analysis or calculations needed to determine the change in optical activity angle, and map that change in optical activity angle to a change in wavelength. The processing device(s) can also perform any necessary analysis or calculations needed to determine the system's visibility, and map that visibility to a specific or change in spectral bandwidth. The processing device(s) can also perform any necessary analysis or calculations needed to manipulate the power detector measurements and map the power meter measurements to some spectral property or properties.

While the present disclosure has been described with reference to one or more particular implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

ALTERNATIVE IMPLEMENTATIONS

Alternative Implementation 1.

A system for measuring a property of electromagnetic radiation, the system comprising: an electromagnetic radiation source configured to produce electromagnetic radiation; a polarizing element configured to receive the electromagnetic radiation produced by the electromagnetic radiation source and output linearly-polarized electromagnetic radiation having a linear polarization angle $\theta_1$; a mode converter configured to receive the linearly-polarized electromagnetic radiation and output an orbital angular momentum (OAM) mode of linearly-polarized electromagnetic radiation with a topological charge $L_i$, the OAM mode of linearly-polarized electromagnetic radiation being a superposition of (i) a first OAM mode with topological charge $L_i$ and a first circular polarization, and (ii) a second OAM mode with topological charge $L_i$ and a second circular polarization, the first circular polarization being opposite from the second circular polarization; an optical fiber configured to receive the first OAM mode and the second OAM mode, and support propagation to an output of the optical fiber of the first OAM mode with an effective index $n_{\mathit{eff}1}$ and the second OAM mode with an effective index $n_{\mathit{eff}2}$, an absolute difference $\Delta n_{\mathit{eff}}$ between $n_{\mathit{eff}1}$ and $n_{\mathit{eff}2}$ being greater than or equal to $5\times10^{-5}$, such that linearly-polarized electromagnetic radiation having a topological charge $L_i$ and a linear polarization angle $\theta_2$ is emitted at the output of the optical fiber; and one or more measurement devices configured to determine the property of the electromagnetic radiation based at least on the polarization angle $\theta_2$ of the electromagnetic radiation emitted at the output of the optical fiber.

Alternative Implementation 2.

The system of Alternative Implementation 1, wherein the first OAM mode is left circularly-polarized and the second OAM mode is right circularly-polarized, or the first OAM mode is right circularly-polarized and the second OAM mode is left circularly-polarized.

Alternative Implementation 3.

The system of Alternative Implementation 1, wherein the optical fiber is a ring-core optical fiber formed from a ring-core and a cladding layer surrounding the ring-core, the ring-core guiding the first OAM mode and the second OAM mode within the fiber.

Alternative Implementation 4.

The system of Alternative Implementation 3, wherein the ring-core includes an annular body and a hollow center.

Alternative Implementation 5.

The system of Alternative Implementation 4, wherein the annular body of the ring-core is formed from germanium-doped silicon dioxide, and the cladding is formed from silicon dioxide.

Alternative Implementation 6.

The system of Alternative Implementation 4, wherein the annular body of the ring-core has a higher refractive index than both the hollow center of the ring-core and the cladding layer.

Alternative Implementation 7.

The system of Alternative Implementation 3, wherein the ring-core has a higher refractive index than the cladding layer.

Alternative Implementation 8.

The system of Alternative Implementation 1, further comprising: an additional polarizing element configured to receive the linearly-polarized electromagnetic radiation from the output of the optical fiber and convert the linearly-polarized electromagnetic radiation having the linear polarization angle $\theta_2$ into a first component have a linear polarization angle $\theta_n$ and a second component having a linear polarization angle $\theta_{n+90°}$; a first power meter configured to measure a power of the first component having the linear polarization angle $\theta_n$; and a second power meter configured to measure a power of the second component having the linear polarization angle $\theta_{n+90°}$, wherein the determined property of the produced electromagnetic radiation is based at least on the measured power of the first component and the measured power of the second component.

Alternative Implementation 9.

The system of Alternative Implementation 8, wherein the determined property is an optical activity angle $\gamma$ determined according to $\gamma = \theta_2 - \theta_1$ and $$\theta_2 = \tan^{-1}\left(\sqrt{\frac{P_{\theta_n+90°}}{P_{\theta_n}}}\right),$$

where $P_{\theta_1}$ is the measured power of the first component having the linear polarization angle $\theta_1$, and where $P_{\theta_{n+90°}}$ is the measured power of the second component having the linear polarization angle $\theta_{n+90°}$.

Alternative Implementation 10.

The system of Alternative Implementation 8, wherein the system is configured to determine an optical activity angle difference $\Delta\gamma$ between (i) a first optical activity angle $\gamma_1$ of a first beam of electromagnetic radiation having a first center wavelength $\lambda_1$, and (ii) a second optical activity angle $\gamma_2$ of a second beam of electromagnetic radiation having a second center wavelength $\lambda_2$.

Alternative Implementation 11.

The system of Alternative Implementation 10, wherein the system is configured to determine a wavelength difference $\Delta\lambda$ between the first beam of electromagnetic radiation and the second beam of electromagnetic radiation, based on the optical activity angle difference $\Delta\gamma$.

Alternative Implementation 12.

The system of Alternative Implementation 13, wherein the wavelength $\lambda$ of the produced electromagnetic radiation is determined according to $$\Delta\lambda = -\frac{\pi z \Delta n_g}{\lambda^2},$$

where $z$ is a length of the optical fiber, and $\Delta n_g$ is a group index difference between the first OAM mode and the second OAM mode.

Alternative Implementation 13.

The system of Alternative Implementation 12, wherein $$-\frac{\pi z \Delta n_g}{\lambda^2}$$

is determined experimentally prior to determining the first optical activity angle $\gamma_1$ of the first beam of electromagnetic radiation and the second optical activity angle $\gamma_2$ of the second beam of electromagnetic radiation.

Alternative Implementation 14.

The system of Alternative Implementation 8, wherein the additional polarizing element is a polarization beam splitter, a rotatable linear polarizer, or a polarimeter.

Alternative Implementation 15.

The system of Alternative Implementation 1, wherein the determined property is a wavelength of the produced electromagnetic radiation.

Alternative Implementation 16.

The system of Alternative Implementation 1, wherein the produced electromagnetic radiation includes electromagnetic radiation in a range of wavelengths, and wherein the determined property is (i) a center wavelength of the range of wavelengths, (ii) a spread of wavelengths in the range of wavelengths, or (iii) both (i) and (ii).

Alternative Implementation 17.

The system of Alternative Implementation 1, wherein the optical fiber has a length of between about 1 centimeter and about 1 kilometer.

Alternative Implementation 18.

The system of Alternative Implementation 1, wherein the first OAM mode propagates with a group index $$n_{g1} = n_{eff1} - \lambda \frac{dn_{eff1}}{d\lambda},$$

and wherein the second OAM mode propagates with a group index $$n_{g2} = n_{eff2} - \lambda \frac{dn_{eff2}}{d\lambda}.$$

Alternative Implementation 19.

The system of Alternative Implementation 18, wherein an absolute difference $\Delta n_g$ between the group index $n_{g1}$ of the first OAM mode and the group index $n_{g2}$ of the second OAM mode increases with the topological charge $L_i$.

Alternative Implementation 20.

The system of Alternative Implementation 1, wherein the topological charge $L_i$ is greater than or equal to 1.

Alternative Implementation 21.

The system of Alternative Implementation 20, wherein the topological charge $L_i$ is between about 1 and about 200.

Alternative Implementation 22.

The system of Alternative Implementation 1, wherein the property of the produced electromagnetic radiation is a wavelength of the produced electromagnetic radiation, and wherein the system has a wavelength resolution based at least in part on a length of the optical fiber, the wavelength resolution of the system being a smallest detectable wavelength difference between electromagnetic radiation having two different wavelengths.

Alternative Implementation 23.

The system of Alternative Implementation 22, wherein the wavelength resolution is about 2.1 nanometers, and wherein the length of the optical fiber is equal to or greater than 1.0 centimeters.

Alternative Implementation 24.

The system of Alternative Implementation 22, wherein the wavelength resolution is about 0.2 nanometers, and wherein the length of the optical fiber is equal to or greater than 6.0 centimeters.

Alternative Implementation 25.

The system of Alternative Implementation 22, wherein the length of the optical fiber is greater than or equal to 1 centimeter.

Alternative Implementation 26.

The system of Alternative Implementation 22, wherein the wavelength resolution is less than or equal to 1.2 nanometers.

Alternative Implementation 27.

The system of Alternative Implementation 1, wherein the electromagnetic radiation emitted at the output optical fiber includes one or more additional modes.

Alternative Implementation 28.

The system of Alternative Implementation 27, further comprising an additional mode converter configured to (i) cause the electromagnetic radiation emitted at the output of the fiber to have a topological charge $L_f=0$, and (ii) cause the one or more additional modes to have a topological charge $L_d \neq 0$, Alternative Implementation 29.

The system of Alternative Implementation 28, further comprising at least one iris positioned between the additional mode converter and the least one measurement devices, the at least one iris being configured to prevent the one or more additional modes from reaching the one or more measurement devices.

Alternative Implementation 30.

The system of Alternative Implementation 29, further comprising a single-mode fiber being positioned between the additional mode converter and the at least one measurement device, the single-mode fiber supporting propagation of the first OAM mode and the second OAM mode, thereby preventing the one or more degenerate modes from reaching the at least one measuring devices.

Alternative Implementation 31.

The system of Alternative Implementation 27, wherein at least one of the one or more additional modes is a degenerate mode.

Alternative Implementation 32.

The system of Alternative Implementation 1, wherein the mode converter is further configured to output additional OAM modes of the linearly-polarized electromagnetic radiation.

Alternative Implementation 33.

The system of Alternative Implementation 32, wherein the additional OAM modes include a third OAM mode and a fourth OAM mode, the third OAM mode and the fourth OAM mode having an identical topological charge that is different than the topological charge of the first OAM mode and the second OAM mode, the third OAM mode and the fourth OAM mode having opposing circular polarizations.

Alternative Implementation 34.

The system of Alternative Implementation 33, wherein the additional OAM modes further include a fifth OAM mode and a sixth OAM mode, the fifth OAM mode and the sixth OAM mode having an identical topological charge that is different than (i) the topological charge of the first OAM mode and the second OAM mode, and (i) the topological charge of the third OAM mode and the fourth OAM mode, the fifth OAM mode and the sixth OAM mode having opposing circular polarizations.

Alternative Implementation 35.

The system of Alternative Implementation 34, further comprising a mode sorter configured to direct (i) the first OAM mode and a second OAM mode to a first set of the one or more measurement devices, (ii) the third OAM mode and a fourth OAM mode to a second set of the one or more measurement devices, and (iii) the fifth OAM mode and a sixth OAM mode to a third set of the one or more measurement devices.

Alternative Implementation 36.

The system of Alternative Implementation 35, wherein the determination of the property of the produced electromagnetic radiation is determined based on measurements of the first set of the one or more measurement devices, and at least one of the second set of the one or more measurement devices or the third set of one or more measurement devices.

Alternative Implementation 37.

The system of Alternative Implementation 36, wherein the determination of the property of the produced electromagnetic radiation based on the first OAM mode and the second OAM mode has a first free spectral range, and wherein a determination of the property of the produced electromagnetic radiation based on the first OAM mode, the second OAM mode, the third OAM mode, and the fourth OAM mode has a second free spectral range greater than the first free spectral range.

Alternative Implementation 38.

The system of Alternative Implementation 37, wherein a determination of the property of the produced electromagnetic radiation based on the first OAM mode, the second OAM mode, the third OAM mode, the fourth OAM mode, the fifth OAM mode, and the sixth OAM mode has a third free spectral range greater than the first free spectral range and the second free spectral range.

Alternative Implementation 39.

The system of Alternative Implementation 1, wherein the determined property of the electromagnetic radiation includes a change in optical activity angle, a change in wavelength, a visibility, a spectral bandwidth, a spectral amplitude, a spectral amplitude ratio, a spectral separation, or any combination thereof, a center wavelength in a range of wavelengths, a spread of wavelengths in the range of wavelengths, or any combination thereof.

Alternative Implementation 40.

The system of Alternative Implementation 1, wherein the one or more measurement devices include: a rotatable polarizing element configured to receive the linearly-polarized electromagnetic radiation emitted at the output of the optical fiber; and a power meter configured to measure a power of electromagnetic radiation passing through the rotatable polarizing element, wherein the rotatable polarizing element is configured to allow a maximum amount of the linearly-polarized electromagnetic radiation emitted at the output of the optical fiber to pass when a rotation angle of the rotatable polarizing element matches the linear polarization angle $\theta_2$.

Alternative Implementation 41.

The system of Alternative Implementation 1, wherein the one or more measurement devices include a polarimeter configured to receive the linearly-polarized electromagnetic radiation emitted at the output of the optical fiber and measure the linear polarization angle $\theta_2$.

Alternative Implementation 42.

A method for measuring a property of electromagnetic radiation, the method comprising: emitting electromagnetic radiation from an electromagnetic radiation source; converting the electromagnetic radiation to linearly-polarized electromagnetic radiation having a polarization angle $\theta_1$; converting the linearly-polarized electromagnetic radiation into a first orbital angular momentum (OAM) mode of linearly-polarized electromagnetic radiation with a topological charge $L_1$, the OAM mode of linearly-polarized electromagnetic radiation being a superposition of (i) a first OAM mode with topological charge $L_1$ and a first circular polarization, and (ii) a second OAM mode with topological charge $L_1$ and a second circular polarization, the first circular polarization being opposite from the second circular polarization; causing (i) the first OAM mode of linearly-polarized electromagnetic radiation to propagate through an optical fiber with an effective index $n_{\mathit{eff}1}$, and (ii) the second OAM mode of linearly-polarized electromagnetic radiation to propagate through the optical fiber with an effective index $n_{\mathit{eff}2}$, an absolute difference $\Delta n_{\mathit{eff}}$ between $n_{\mathit{eff}1}$ and $n_{\mathit{eff}2}$ being greater than or equal to $5 \times 10^{-5}$, such that linearly-polarized electromagnetic radiation having a topological charge $L_1$ and a linear polarization angle $\theta_2$ is emitted at the output of the optical fiber; determining the property of the produced electromagnetic radiation based at least on the linear polarization angle $\theta_2$.

Alternative Implementation 43.

The method of Alternative Implementation 42, further comprising: converting the linearly-polarized electromagnetic radiation emitted at the output of the optical fiber into a first component have a linear polarization angle $\theta_n$ and a second component having a linear polarization angle $\theta_{n+90°}$; measuring a power of the first component having the linear polarization angle $\theta_n$; measuring a power of the second component having the linear polarization angle $\theta_{n+90°}$; and determining the property of the produced electromagnetic radiation based at least on the measured power of the first component and the measured power of the second component.

Alternative Implementation 44.

The method of Alternative Implementation 42, further comprising: converting the linearly-polarized electromagnetic radiation into a second OAM mode of linearly-polarized electromagnetic radiation with a topological charge $L_2$, the additional OAM mode of linearly-polarized electromagnetic radiation being a superposition of (i) a third OAM mode with topological charge $L_2$ and the first circular polarization, and (ii) a fourth OAM mode with topological charge $L_2$ and the second circular polarization; causing the third OAM mode and the fourth OAM mode to propagate through the optical fiber with the first OAM mode and the second OAM mode such that the linearly-polarized electromagnetic radiation emitted at the output of the optical fiber includes (i) linearly-polarized electromagnetic radiation having the topological charge $L_1$ and the linear polarization angle $\theta_2$ and (ii) linearly-polarized electromagnetic radiation having the topological charge $L_2$ and the linear polarization angle $\theta_3$; determining the property of the produced electromagnetic radiation based at least on the linear polarization angle $\theta_2$ and the linear polarization angle $\theta_3$.

Alternative Implementation 45.

The method of Alternative Implementation 44, wherein the determination of the property of the produced electromagnetic radiation based on the linear polarization angle $\theta_2$ has a first free spectral range, and wherein the determination of the property of the produced electromagnetic radiation based on the linear polarization angle $\theta_2$ and the linear polarization angle $\theta_3$ has a second free spectral range greater than the first free spectral range.

Alternative Implementation 46.

The method of Alternative Implementation 44, further comprising: converting the linearly-polarized electromagnetic radiation into a third OAM mode of linearly-polarized electromagnetic radiation with a topological charge $L_2$, the additional OAM mode of linearly-polarized electromagnetic radiation being a superposition of (i) a fifth OAM mode with topological charge $L_3$ and the first circular polarization, and (ii) a sixth OAM mode with topological charge $L_3$ and the second circular polarization; causing the fifth OAM mode and the sixth OAM mode to propagate through the optical fiber with the first OAM mode, the second OAM mode, the third OAM mode, and the fourth OAM mode such that the linearly-polarized electromagnetic radiation emitted at the output of the optical fiber includes (i) linearly-polarized electromagnetic radiation having the topological charge $L_1$ and the linear polarization angle $\theta_2$, (ii) linearly-polarized electromagnetic radiation having the topological charge $L_2$ and the linear polarization angle $\theta_3$, and (iii) linearly-polarized electromagnetic radiation having the topological charge $L_3$ and the linear polarization angle $\theta_4$; determining the property of the produced electromagnetic radiation based at least on the linear polarization angle $\theta_2$, the linear polarization angle $\theta_3$, and the linear polarization angle $\theta_4$.

Alternative Implementation 47.

The method of Alternative Implementation 46, wherein the determination of the property of the produced electromagnetic radiation based on the linear polarization angle $\theta_2$, the linear polarization angle $\theta_3$, and the linear polarization angle $\theta_4$ has a third free spectral range greater than the first free spectral range and the second free spectral range.

Alternative Implementation 48.

The method of Alternative Implementation 46, further comprising: causing, after being emitted at the output of the optical fiber, the first OAM mode of linearly-polarized electromagnetic radiation, the second OAM mode of linearly-polarized electromagnetic radiation, and the third OAM mode of linearly-polarized electromagnetic radiation pass through a rotatable polarizing element as the rotatable polarizing element rotates; measuring a maximum power and a minimum power of the first OAM mode of linearly-polarized electromagnetic radiation passing through the rotatable polarizing element; measuring a maximum power and a minimum power of the second OAM mode of linearly-polarized electromagnetic radiation passing through the rotatable polarizing element; measuring a maximum power and a minimum power of the third OAM mode of linearly-polarized electromagnetic radiation passing through the rotatable polarizing element; determining a visibility for each of the first OAM mode, the second OAM mode, and the third OAM mode, based at least on the maximum and minimum power of each of the first OAM mode, the second OAM mode, and the third OAM mode passing through the rotatable polarizing element; and determining a spectral bandwidth of the emitted electromagnetic radiation based at least on the determined visibility for each of the first OAM mode, the second OAM mode, and the third OAM mode.

Alternative Implementation 49.

A system for measuring a linear polarization angle of electromagnetic radiation, the system comprising: an electromagnetic radiation source configured to produce electromagnetic radiation; a polarizing element configured to receive the electromagnetic radiation produced by the electromagnetic radiation source and output linearly-polarized electromagnetic radiation having a linear polarization angle $\theta_1$; a mode converter configured to receive the linearly-polarized electromagnetic radiation and output an orbital angular momentum (OAM) mode of linearly-polarized electromagnetic radiation with a topological charge $L_i$, the OAM mode of linearly-polarized electromagnetic radiation being a superposition of (i) a first OAM mode with topological charge $L_i$ and a first circular polarization, and (ii) a second OAM mode with topological charge $L_i$ and a second circular polarization, the first circular polarization being opposite from the second circular polarization; an optical fiber configured to receive the first OAM mode and the second OAM mode, and support propagation to an output of the optical fiber of the first OAM mode with an effective index $n_{\it{eff1}}$ and the second OAM mode with an effective index $n_{\it{eff2}}$, an absolute difference $\Delta n_{\it{eff}}$ between $n_{\it{eff1}}$ and $n_{\it{eff2}}$ being greater than or equal to $5\times10^{-5}$, such that linearly-polarized electromagnetic radiation having a topological charge $L_i$ and a linear polarization angle $\theta_2$ is emitted at the output of the optical fiber; and a rotatable polarizing element configured to allow a maximum amount of the linearly-polarized electromagnetic radiation emitted at the output of the optical fiber to pass when a rotation angle of the rotatable polarizing element matches the linear polarization angle $\theta_2$.

Alternative Implementation 50.

A system for measuring a linear polarization angle of electromagnetic radiation, the system comprising: an electromagnetic radiation source configured to produce electromagnetic radiation; a polarizing element configured to receive the electromagnetic radiation produced by the electromagnetic radiation source and output linearly-polarized electromagnetic radiation having a linear polarization angle $\theta_1$; a mode converter configured to receive the linearly-polarized electromagnetic radiation and output an orbital angular momentum (OAM) mode of linearly-polarized electromagnetic radiation with a topological charge $L_i$, the OAM mode of linearly-polarized electromagnetic radiation being a superposition of (i) a first OAM mode with topological charge $L_i$ and a first circular polarization, and (ii) a second OAM mode with topological charge $L_i$ and a second circular polarization, the first circular polarization being opposite from the second circular polarization; an optical fiber configured to receive the first OAM mode and the second OAM mode, and support propagation to an output of the optical fiber of the first OAM mode with an effective index $n_{\it{eff1}}$ and the second OAM mode with an effective index $n_{\it{eff2}}$, an absolute difference $\Delta n_{\it{eff}}$ between $n_{\it{eff1}}$ and $n_{\it{eff2}}$ being greater than or equal to $5\times10^{-5}$, such that linearly-polarized electromagnetic radiation having a topological charge $L_1$ and a linear polarization angle $\theta_2$ is emitted at the output of the optical fiber; and a polarimeter configured to receive the linearly-polarized electromagnetic radiation emitted at the output of the optical fiber and measure the linear polarization angle $\theta_2$.

It is expressly contemplated that one or more elements or any portion(s) thereof from any of the Alternative Implementations 1-50 above can be combined with one or more elements or any portion(s) thereof from any of the other ones of the Alternative Implementations 1-50 to form one or more additional alternative implementations of the present disclosure.

What is claimed is:

1. A system for measuring a property of electromagnetic radiation, the system comprising:

an electromagnetic radiation source configured to produce electromagnetic radiation;
a polarizing element configured to receive the electromagnetic radiation produced by the electromagnetic radiation source and output linearly-polarized electromagnetic radiation having a linear polarization angle $\theta_1$;
a mode converter configured to receive the linearly-polarized electromagnetic radiation and output an orbital angular momentum (OAM) mode of linearly-polarized electromagnetic radiation with a topological charge $L_i$, the OAM mode of linearly-polarized electromagnetic radiation being a superposition of (i) a first OAM mode with topological charge $L_i$ and a first circular polarization, and (ii) a second OAM mode with topological charge $L_i$ and a second circular polarization, the first circular polarization being opposite from the second circular polarization;
an optical fiber configured to receive the first OAM mode and the second OAM mode, and support propagation to an output of the optical fiber of the first OAM mode with an effective index $n_{\it{eff1}}$ and the second OAM mode with an effective index $n_{\it{eff2}}$, an absolute difference $\Delta n_{\it{eff}}$ between $n_{\it{eff1}}$ and $n_{\it{eff2}}$ being greater than or equal to $5\times10^{-5}$, such that linearly-polarized electromagnetic radiation having a topological charge $L_i$ and a linear polarization angle $\theta_2$ is emitted at the output of the optical fiber; and
one or more measurement devices configured to determine the property of the electromagnetic radiation based at least on the polarization angle $\theta_2$ of the electromagnetic radiation emitted at the output of the optical fiber.

2. The system of claim 1, further comprising:
an additional polarizing element configured to receive the linearly-polarized electromagnetic radiation from the output of the optical fiber and convert the linearly-polarized electromagnetic radiation having the linear polarization angle $\theta_2$ into a first component have a linear polarization angle $\theta_n$ and a second component having a linear polarization angle $\theta_{n+90°}$;
a first power meter configured to measure a power of the first component having the linear polarization angle $\theta_n$; and
a second power meter configured to measure a power of the second component having the linear polarization angle $\theta_{n+90°}$,
wherein the determined property of the produced electromagnetic radiation is based at least on the measured power of the first component and the measured power of the second component.

3. The system of claim 2, wherein the determined property is an optical activity angle $\gamma$ determined according to $\gamma=\theta_2-\theta_1$ and $$\theta_2 = \tan^{-1}\left(\sqrt{\frac{P_{\theta_n+90°}}{P_{\theta_n}}}\right),$$

where $P_{\theta_1}$ is the measured power of the first component having the linear polarization angle $\theta_1$, and where $P_{\theta_{n+90°}}$ is the measured power of the second component having the linear polarization angle $\theta_{n+90°}$.

4. The system of claim 2, wherein the system is configured to determine an optical activity angle difference $\Delta\gamma$ between (i) a first optical activity angle $\gamma_1$ of a first beam of electromagnetic radiation having a first center wavelength $\lambda_1$, and (ii) a second optical activity angle $\gamma_2$ of a second beam of electromagnetic radiation having a second center wavelength $\lambda_2$.

5. The system of claim 4, wherein the system is configured to determine a wavelength difference $\Delta\lambda$ between the first beam of electromagnetic radiation and the second beam of electromagnetic radiation, based on the optical activity angle difference $\Delta\gamma$.

6. The system of claim 5, wherein the wavelength $\lambda$ of the produced electromagnetic radiation is determined according to $$\Delta\lambda = -\frac{\pi z \Delta n_g}{\lambda^2},$$

where z is a length of the optical fiber, and $\Delta n_g$ is a group index difference between the first OAM mode and the second OAM mode.

7. The system of claim 1, wherein the optical fiber has a length of between about 1 centimeter and about 1 kilometer.

8. The system of claim 1, wherein the first OAM mode propagates with a group index $n_{g1}$ and the second OAM mode propagates with a group index $n_{g2}$, and wherein an absolute difference $\Delta n_g$ between a group index $n_{g1}$ of the first OAM mode and the group index $n_{g2}$ of the second OAM mode increases with the topological charge $L_i$.

9. The system of claim 1, wherein the topological charge $L_i$ is greater than or equal to 1.

10. The system of claim 9, wherein the topological charge $L_i$ is between about 1 and about 200.

11. The system of claim 1, wherein the mode converter is further configured to output additional OAM modes of the linearly-polarized electromagnetic radiation, the additional OAM modes including a third OAM mode and a fourth OAM mode, the third OAM mode and the fourth OAM mode having an identical topological charge that is different than the topological charge of the first OAM mode and the second OAM mode, the third OAM mode and the fourth OAM mode having opposing circular polarizations.

12. The system of claim 11, further comprising a mode sorter configured to direct (i) the first OAM mode and a second OAM mode to a first set of the one or more measurement devices, and (ii) the third OAM mode and a fourth OAM mode to a second set of the one or more measurement devices.

13. The system of claim 12, wherein the determination of the property of the produced electromagnetic radiation is determined based on measurements of the first set of the one or more measurement devices and the second set of the one or more measurement devices.

14. The system of claim 13, wherein the determination of the property of the produced electromagnetic radiation based on the first OAM mode and the second OAM mode has a first free spectral range, and wherein a determination of the property of the produced electromagnetic radiation based on the first OAM mode, the second OAM mode, the third OAM mode, and the fourth OAM mode has a second free spectral range greater than the first free spectral range.

15. The system of claim 1, wherein the determined property of the electromagnetic radiation includes a change in optical activity angle, a change in wavelength, a visibility, a spectral bandwidth, a spectral amplitude, a spectral amplitude ratio, a spectral separation, or any combination thereof, a center wavelength in a range of wavelengths, a spread of wavelengths in the range of wavelengths, or any combination thereof.

16. A method for measuring a property of electromagnetic radiation, the method comprising:
emitting electromagnetic radiation from an electromagnetic radiation source;
converting the electromagnetic radiation to linearly-polarized electromagnetic radiation having a polarization angle $\theta_1$;
converting the linearly-polarized electromagnetic radiation into a first orbital angular momentum (OAM) mode of linearly-polarized electromagnetic radiation with a topological charge $L_1$, the OAM mode of linearly-polarized electromagnetic radiation being a superposition of (i) a first OAM mode with topological charge $L_1$ and a first circular polarization, and (ii) a second OAM mode with topological charge $L_1$ and a second circular polarization, the first circular polarization being opposite from the second circular polarization;
causing (i) the first OAM mode of linearly-polarized electromagnetic radiation to propagate through an optical fiber with an effective index $n_{\mathit{eff}1}$, and (ii) the second OAM mode of linearly-polarized electromagnetic radiation to propagate through the optical fiber with an effective index $n_{\mathit{eff}2}$, an absolute difference $\Delta n_{\mathit{eff}}$ between $n_{\mathit{eff}1}$ and $n_{\mathit{eff}2}$ being greater than or equal to $5\times10^{-5}$, such that linearly-polarized electromagnetic radiation having a topological charge $L_1$ and a linear polarization angle $\theta_2$ is emitted at the output of the optical fiber; and
determining the property of the produced electromagnetic radiation based at least on the linear polarization angle $\theta_2$.

17. The method of claim 16, further comprising:
converting the linearly-polarized electromagnetic radiation into a second OAM mode of linearly-polarized electromagnetic radiation with a topological charge $L_2$, the additional OAM mode of linearly-polarized electromagnetic radiation being a superposition of (i) a third OAM mode with topological charge $L_2$ and the first circular polarization, and (ii) a fourth OAM mode with topological charge $L_2$ and the second circular polarization;
causing the third OAM mode and the fourth OAM mode to propagate through the optical fiber with the first OAM mode and the second OAM mode such that the linearly-polarized electromagnetic radiation emitted at the output of the optical fiber includes (i) linearly-polarized electromagnetic radiation having the topological charge $L_1$ and the linear polarization angle $\theta_2$ and (ii) linearly-polarized electromagnetic radiation having the topological charge $L_2$ and the linear polarization angle $\theta_3$; and
determining the property of the produced electromagnetic radiation based at least on the linear polarization angle $\theta_2$ and the linear polarization angle $\theta_3$.

18. The method of claim 17, further comprising:
converting the linearly-polarized electromagnetic radiation into a third OAM mode of linearly-polarized electromagnetic radiation with a topological charge $L_2$, the additional OAM mode of linearly-polarized electromagnetic radiation being a superposition of (i) a fifth OAM mode with topological charge $L_3$ and the first circular polarization, and (ii) a sixth OAM mode with topological charge $L_3$ and the second circular polarization;

causing the fifth OAM mode and the sixth OAM mode to propagate through the optical fiber with the first OAM mode, the second OAM mode, the third OAM mode, and the fourth OAM mode such that the linearly-polarized electromagnetic radiation emitted at the output of the optical fiber includes (i) linearly-polarized electromagnetic radiation having the topological charge $L_1$ and the linear polarization angle $\theta_2$, (ii) linearly-polarized electromagnetic radiation having the topological charge $L_2$ and the linear polarization angle $\theta_3$, and (iii) linearly-polarized electromagnetic radiation having the topological charge $L_3$ and the linear polarization angle $\theta_4$; and determining the property of the produced electromagnetic radiation based at least on the linear polarization angle $\theta_2$, the linear polarization angle $\theta_3$, and the linear polarization angle $\theta_4$.

19. The method of claim 18, wherein the determination of the property of the produced electromagnetic radiation based on the linear polarization angle $\theta_2$, the linear polarization angle $\theta_3$, and the linear polarization angle $\theta_4$ has a third free spectral range greater than the first free spectral range and the second free spectral range.

20. The method of claim 18, further comprising:

causing, after being emitted at the output of the optical fiber, the first OAM mode of linearly-polarized electromagnetic radiation, the second OAM mode of linearly-polarized electromagnetic radiation, and the third OAM mode of linearly-polarized electromagnetic radiation pass through a rotatable polarizing element as the rotatable polarizing element rotates;

measuring a maximum power and a minimum power of the first OAM mode of linearly-polarized electromagnetic radiation passing through the rotatable polarizing element;

measuring a maximum power and a minimum power of the second OAM mode of linearly-polarized electromagnetic radiation passing through the rotatable polarizing element;

measuring a maximum power and a minimum power of the third OAM mode of linearly-polarized electromagnetic radiation passing through the rotatable polarizing element;

determining a visibility for each of the first OAM mode, the second OAM mode, and the third OAM mode, based at least on the maximum and minimum power of each of the first OAM mode, the second OAM mode, and the third OAM mode passing through the rotatable polarizing element; and determining a spectral bandwidth of the emitted electromagnetic radiation based at least on the determined visibility for each of the first OAM mode, the second OAM mode, and the third OAM mode.

* * * * *